United States Patent
Gustaveson

(10) Patent No.: US 10,374,349 B2
(45) Date of Patent: Aug. 6, 2019

(54) PORT LOCK SYSTEM AND APPARATUS

(71) Applicant: SOL PALS, LLC, Lehi, UT (US)

(72) Inventor: Ronald Glen Gustaveson, Draper, UT (US)

(73) Assignee: SOL PALS, LLC, Lehi, UT (US)

( * ) Notice: Subject to any disclaimer, the term of this patent is extended or adjusted under 35 U.S.C. 154(b) by 0 days.

(21) Appl. No.: 15/752,652

(22) PCT Filed: Feb. 8, 2018

(86) PCT No.: PCT/US2018/017483
§ 371 (c)(1),
(2) Date: Feb. 14, 2018

(87) PCT Pub. No.: WO2018/200058
PCT Pub. Date: Nov. 1, 2018

(65) Prior Publication Data
US 2019/0036266 A1    Jan. 31, 2019

Related U.S. Application Data

(60) Provisional application No. 62/489,908, filed on Apr. 25, 2017.

(51) Int. Cl.
*H01R 13/627* (2006.01)
*H01R 13/443* (2006.01)
(Continued)

(52) U.S. Cl.
CPC ......... *H01R 13/443* (2013.01); *E05B 35/008* (2013.01); *E05B 73/0082* (2013.01);
(Continued)

(58) Field of Classification Search
CPC .............. H01R 13/6272; H01R 23/025; H01R 13/635; H01R 23/684; H01R 13/7175
(Continued)

(56) References Cited

U.S. PATENT DOCUMENTS 5,057,038 A * 10/1991 Bowen ............... H01R 13/6585
439/497
6,019,521 A * 2/2000 Manning ............... G02B 6/3869
385/56
(Continued)

FOREIGN PATENT DOCUMENTS

CN    202587686    12/2012

OTHER PUBLICATIONS

International Search Report for application PCT/US18/17483 dated Apr. 20, 2018.
(Continued)

*Primary Examiner* — Phuong Chi T Nguyen
(74) *Attorney, Agent, or Firm* — Workman Nydegger

(57) ABSTRACT

Embodiments include systems, methods, and apparatuses configured to secure physical interface ports (or sockets) of an electronic device through physical lock and key mechanisms. In at least one implementation, a system is provided for locking a physical port or socket of an electronic device. The system includes a lock for insertion into a port or socket of the electronic device. The lock includes a structural interface member that is configured to align with a selected port or socket of the electronic device into which the lock is to be inserted. The lock further includes an exterior fascia that is affixed to the structural interface member, and a detent that holds the lock in place within the port or socket. The system also includes a key for disengaging the lock.

17 Claims, 28 Drawing Sheets

(51) Int. Cl.
*G06F 21/86* (2013.01)
*H01R 13/447* (2006.01)
*H01R 13/639* (2006.01)
*G06F 21/85* (2013.01)
*E05B 35/00* (2006.01)
*E05B 73/00* (2006.01)
*E05C 19/06* (2006.01)
*H01R 13/633* (2006.01)

(52) U.S. Cl.
CPC .............. *E05C 19/06* (2013.01); *G06F 21/85* (2013.01); *G06F 21/86* (2013.01); *H01R 13/447* (2013.01); *H01R 13/6397* (2013.01); *H01R 13/6335* (2013.01); *H01R 2201/06* (2013.01)

(58) Field of Classification Search
USPC .......................................................... 439/352
See application file for complete search history.

(56) References Cited

U.S. PATENT DOCUMENTS

| | | | | |
|---|---|---|---|---|
| 6,618,259 | B1* | 9/2003 | Hood, III | G06K 13/0825 361/726 |
| 6,994,561 | B2* | 2/2006 | Pepe | H01R 9/2491 361/796 |
| 8,353,715 | B1* | 1/2013 | Zhou | H01R 13/6335 439/352 |
| 9,761,998 | B2* | 9/2017 | De Dios Martin | H01R 13/6272 |
| 2003/0015446 | A1 | 1/2003 | Talbot | |
| 2008/0041125 | A1 | 2/2008 | Poppe | |
| 2012/0108088 | A1 | 5/2012 | Peng | |
| 2012/0289069 | A1 | 11/2012 | Chueh | |
| 2014/0130555 | A1 | 5/2014 | Clark | |
| 2014/0157839 | A1 | 6/2014 | Theobald | |
| 2016/0294118 | A1 | 10/2016 | Ahn | |

OTHER PUBLICATIONS

USB Port Lock/Blocker. Shopclues [online]. [retrieved Apr. 2, 2019]. URL: <http://shreedatta-security-peripherals.shopclues.com/usb-port-lock-blocker.html?.

Entry Level USB Port Lock Key (Dark Blue). Amazon [online]. Smart Keeper [retrieved Apr. 2, 2019] URL: <https://www.amazon.com/Entry-Level-Port-Lock-Dark/dp/B07H374DDK/ref=sr_1_6?s=electronics&ie=UTF8&qid=1546024540&sr=1-6&keywords=smart+keeper+usb+port+lock>.

Entry Level USB Port Lock (Purple): 10 Pack. Amazon [online]. Smart Kepper [retrieved Apr. 2, 2019] URL: <https://www.amazon.com/Entry-Level-Port-Lock-Purple/dp/B07H5T217S/ref=sr_1_4?s=electronics&ie=UTF8&qid=1546024540&sr=1-4&keywords=smart+keeper+usb+port+lock>.

Lindy USB Port Blacker—Pack of 4, Blue (40452). Amazon [online]. Lindy [retrieved Apr. 2, 2019] URL: <https://www.amazon.com/Lindy-USB-Port-Blocker-40452/dp/B00012JWJA/ref=sr_1_3?s=electronics&ie=UTF8&qid=1546024367&sr=1-3&keywords=USB+port+lock>.

Secumate USB Port Locks. SecuPlusShop [online]. [retrieved Apr. 2, 2019] URL: <https://www.secuplus-shop.nl/en/secumate-usb-port-locks.html>.

Delock USB Port Blocker for USB a female/lock & protect any free USB ports. Amazon [online]. Delock [retrieved Apr. 2, 2019] URL: <https://www.amazon.com/Delock-Blocker-female-protect-ports/dp/B018C5ESCK/ref=sr_1_50?s=electronics&ie=UTF8&qid=1546023019&sr=1-50&keywords=USB+port+lock>.

Kensington USB Port Lock with Blockers, K67913WW. Amazon [online]. Kensington [retrieved Apr. 2, 2019] URL: <https://www.amazon.com/Kensington-Port-Lock-Blockers-K67913WW/dp/B018E0L00Q/ref=sr_1_8?s=electronics&ie=UTF8&qid=1546022183&sr=1-8&keywords=port+lock>.

PadJack USB Port Blocker and Lock. Amazon [online]. PadJack Inc. [retrieved Apr. 2, 2019] URL: <https://www.amazon.com/PadJack-USB-Port-Blocker-Lock/dp/B01BG9N910/ref=sr_1_21?s=electronics&ie=UTF8&qid=1546022995&sr=1-21&keywords=USB+port+lock>.

Lindy USB C 3 Port Lock Kit—4 X Locks with Key 40459. Raru [online]. [retrieved Apr. 2, 2019] URL:<https://raru.co.za/electronics/5789604-lindy-usb-c-3-port-lock-kit-4-x-locks-with-key>.

NTW NL-PBK50-RD Locking RJ45 Port/Dust Blocker with Color Coded Keys. Amazon [online]. NTW [retrieved Apr. 2, 2019] URL: <https://www.amazon.com/NTW-NL-PBK50-RD-Locking-Blocker-Color/dp/B00KONIQHC/ref=sr_1_3?s=electronics&ie=UTF8&qid=1546022183&sr=1-3&keywords=port+lock>.

Lindy RJ45 port lock (10 pieces) with key Color: Green. Amazon [online]. LINDY-USA [retrieved Apr. 2, 2019] URL: <https://www.amazon.com/LINDY-RJ45-port-pieces-Color/dp/B00Y35L79Q/ref=sr_1_108?s=electronics&ie=UTF8&qid=1546024209&sr=1-108&keywords=port+lock> -.

Lindy 10 x RJ45 Port Blocker with Key 40470. Amazon [online]. Lindy [retrieved Apr. 2, 2019] URL: <https://www.amazon.com/Lindy-RJ45-Port-Blocker-40470/dp/B00F3VBND4/ref=sr_1_26?s=electronics&ie=UTF8&qid=1546022995&sr=1-26&keywords=USB+port+lock>.

* cited by examiner

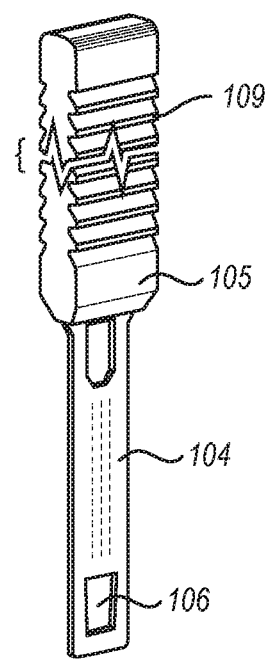
*FIG. 5A*
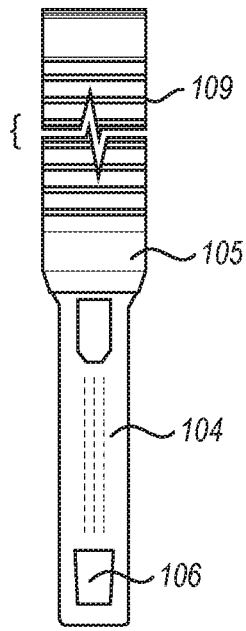 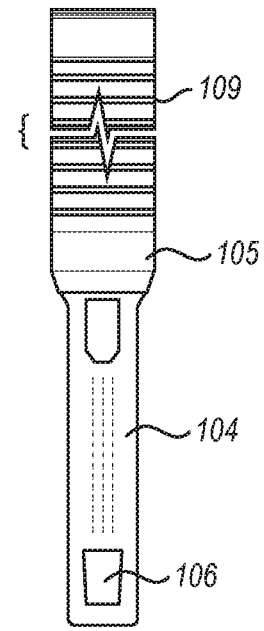
*FIG. 5B*  *FIG. 5C*

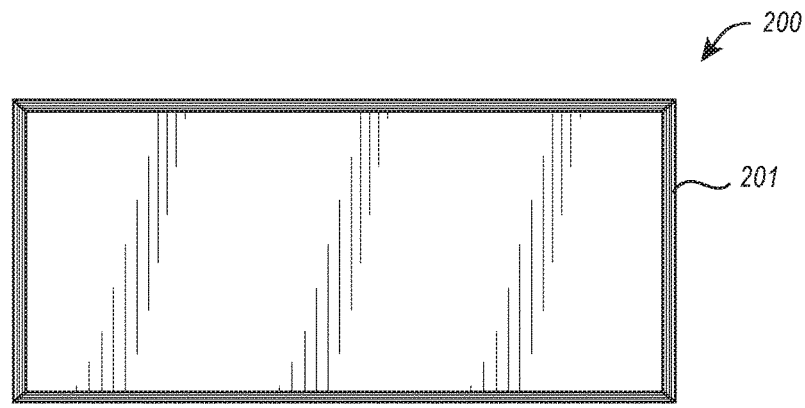
FIG. 10D
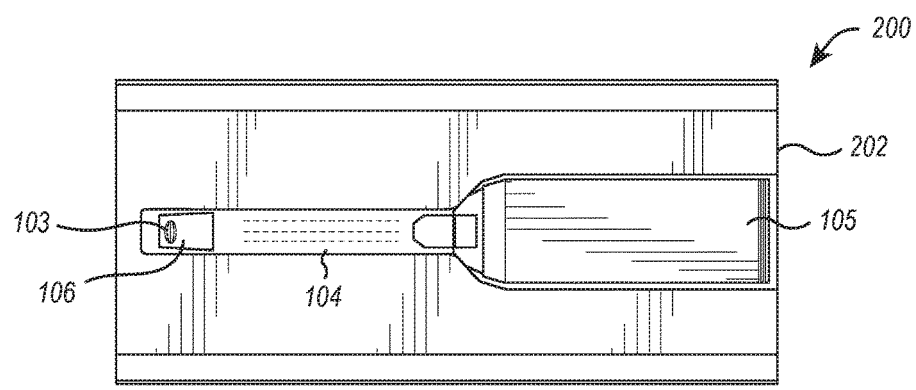
FIG. 10E
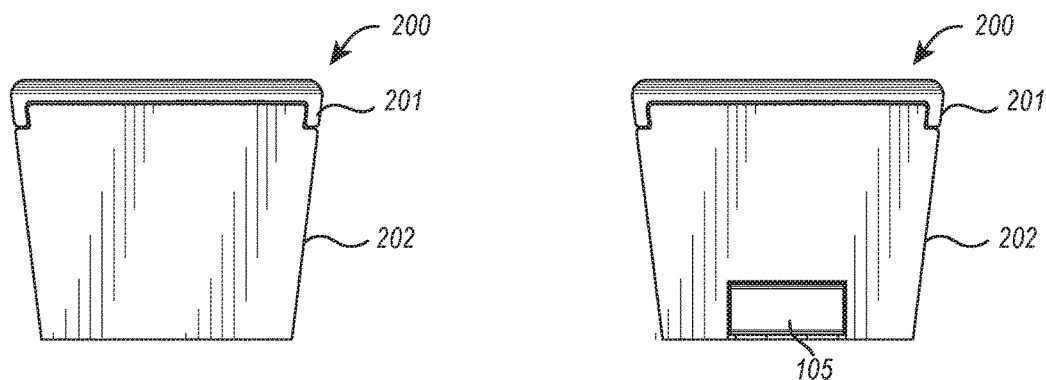
FIG. 10F          FIG. 10G

PORT LOCK SYSTEM AND APPARATUS

CROSS-REFERENCE TO RELATED APPLICATIONS

The present invention is a 35 U.S.C. § 371 U.S. National Stage of PCT Application No. PCT/US2018/017483, filed Feb. 8, 2018, which claims the benefit of United States Patent Application No. 62/489,908, filed on Apr. 25, 2017, and entitled USB LOCK SYSTEM AND APPARATUS, the entire content of which is incorporated herein by reference.

BACKGROUND OF THE INVENTION

1. Technical Field

Implementations of the present invention relate to systems, methods, and apparatus for securing computer physical interface ports, such as USB receiver sockets, audio jack ports, or the like.

2. Background and Relevant Art

Electronic devices ranging from mobile phones to large network servers often use a wide range of physical interfaces that enable users to interact with the given device's operating system. These range from customary touch input interfaces, such as keyboards and touchscreens, to wired computerized interfaces such as Universal Serial Bus ports, display ports, and audio jack ports, to wireless computerized interfaces such as camera ports, WIFI, Bluetooth, and other interfaces.

Computer manufacturers tend to focus primarily on securing wireless interfaces from unwanted intrusion. Physical interfaces are typically left open and are thus vulnerable to malicious users.

BRIEF SUMMARY

Embodiments described herein include systems, methods, and apparatuses configured to secure physical interface ports (or sockets) of an electronic device through physical lock and key mechanisms. In at least one implementation, a system is provided for locking a physical port or socket of an electronic device. The system includes a lock for insertion into a port or socket of an electronic device. The lock includes a structural interface member that is configured to align with a selected port or socket of the electronic device into which the lock is to be inserted. The lock further includes an exterior fascia that is affixed to the structural interface member, and a detent that holds the lock in place within the port or socket. The system also includes a key for disengaging the lock.

In another embodiment, a method of manufacturing a lock is provided for use with a port or socket of an electronic device. This method of manufacturing includes providing a body portion that is configured for insertion into a port or socket. The body portion has recesses or detents for securing the body portion within the port or socket. The method further includes providing a front face for the body portion, where the front face has a planar portion sufficient for receiving human-readable (e.g. printed) indicia. The front face further includes a key hole for receiving a key. Furthermore, the method of manufacturing includes providing the key for insertion into the key hole of the front face. The key is configured to release the body portion from within the port or socket upon depression.

In another embodiment, a universal serial bus (USB) lock system is provided for locking USB ports on an electronic device. The USB lock system includes a USB lock for insertion into a USB port. The USB lock includes a structural interface member having a cavity for alignment with a USB port, an exterior fascia that is affixed to the structural interface member, and a detent that holds the USB lock in place within the USB port. The USB lock system also includes a key for disengaging the USB lock. Optionally, the USB lock system may have a storage box for holding the USB lock and the key simultaneously.

A USB lock may include a body that a user can insert into a USB port. The body comprises one or more detents that secure the body within the USB port until released. In at least one implementation, the body provides a keyhole. Implementations of the present invention further comprise a key that can be inserted into the keyhole. Once inserting a key into the keyhole, the user can then release the detents of the body from the interface port and remove the body from the interface port.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A-5G illustrate various views of a second embodiment of a key for unlocking a port or socket of an electronic device.

FIGS. 10A-10G illustrate various views of a storage box for a lock and key, showing an enclosed key.

DETAILED DESCRIPTION

Figure 1A:
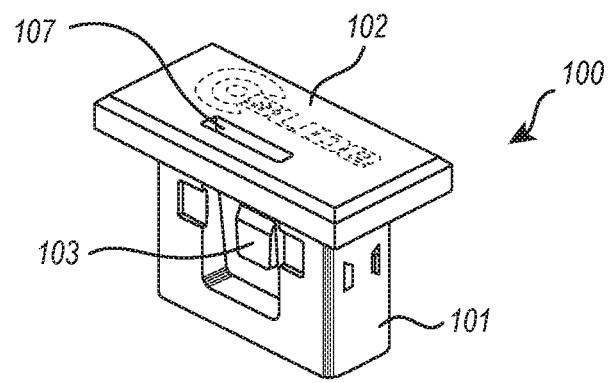
FIGS. 1A-1G illustrate various views of a system for locking a physical port or socket of an electronic device.

As noted above, the embodiments described herein include systems, methods, and apparatuses configured to secure physical interface ports (or sockets) of an electronic device through physical lock and key mechanisms. In at least one implementation, a system is provided for locking a physical port or socket of an electronic device. The system includes a lock for insertion into a port or socket of an electronic device. The lock includes a structural interface member that is configured to align with a selected port or socket of the electronic device into which the lock is to be inserted. The lock further includes an exterior fascia that is affixed to the structural interface member, and a detent that holds the lock in place within the port or socket. The system also includes a key for disengaging the lock.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated.

Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number.

In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment. The headings used herein are for organizational purposes only and are not meant to be used to limit the scope of the description or the claims.

As illustrated in FIGS. 1A-1G, a securing system 100 is provided for securing physical interface ports. Although the securing system 100 in FIGS. 1A-1G is designed to secure a USB port, it will be recognized that the securing system may be designed to fit in substantially any type of physical port or socket on a mobile or stationary electronic device. The securing system 100 includes or is itself a lock that is inserted into a port or socket on a device. As such, the securing system will alternately be referred to as a "lock," "port lock" or "lock 100." The lock 100 includes a structural interface member 101 that is configured to align with a selected port or socket of the electronic device into which the lock is to be inserted (as will be discussed further below with regard to FIG. 9. The lock also includes an exterior fascia 102 that is visible once the lock has been inserted into the port. Still further, the lock 100 includes a detent 103 or other locking mechanism that holds the lock in place within the port so that a would-be malicious user cannot simply remove the lock.

As shown in FIG. 2, a key 104 is used to remove the lock 100. The key 104 includes a handle 105 and a cavity 106 that slides over the detent 103. When inserted properly, the cavity 106 will be placed over or around the detent 103, thus allowing the lock 101 to be removed. Although only one detent 103 is shown in FIGS. 1A-2, it will be recognized that many such detents may be included on the structural interface member 101. These may be positioned on any surface of the structural interface member, in various types of patterns. Corresponding keys may then be used to release the detents and allow removal of the lock. In more secure embodiments, more elaborate and complex keys and detents may be used.

Figure 1B:
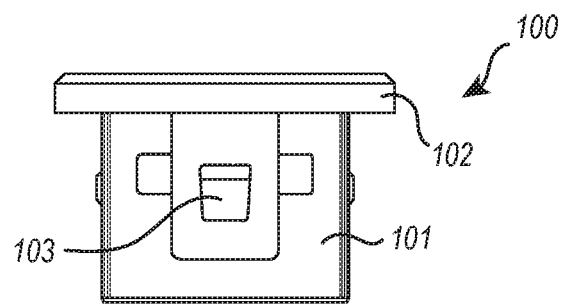
Figure 1C:
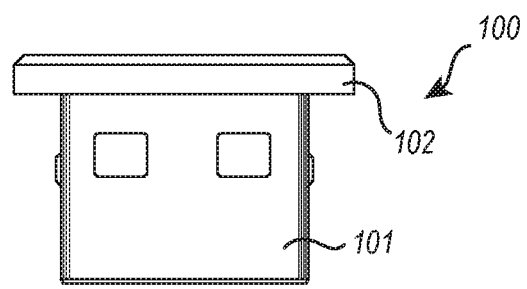
Figure 1D:
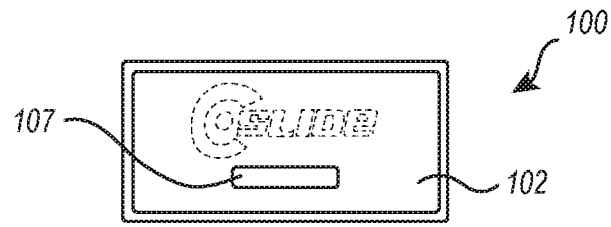
Figure 1E:
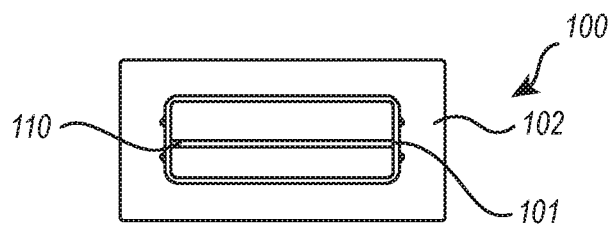
Figure 1F:
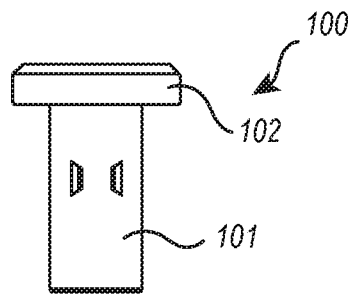
Figure 1G:
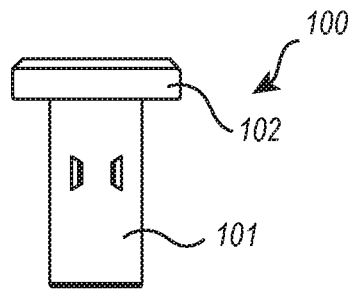

FIGS. 1A-1G show various views of an example lock 100. FIG. 1A shows a front perspective view, FIG. 1B shows a front facing view, FIG. 1C shows a back facing view, and FIGS. 1D-1G show top, bottom, left side and right side views, respectively. Each part of the lock and key may be made of the same or different materials. The structural interface member 101, for example, may be made of metal, plastic, ceramic or other material suitable for insertion into electronic ports or sockets. The exterior fascia 102 may be made of plastic, silicone, metal, ceramic, wood or other material suitable to provide a covering for the lock. In some embodiments, the exterior fascia 102 is made of a printable material, or allows a coating of a printable material to be applied thereon. As such, the exterior fascia 102 may have a logo, picture, word or other item printed thereon. The key 104 may also be made of any of the above-listed materials, or combination of such materials. The key handle 105 may also allow printing thereon. As such, the lock and key may be branded for a specified company or entity.

Figure 2A:
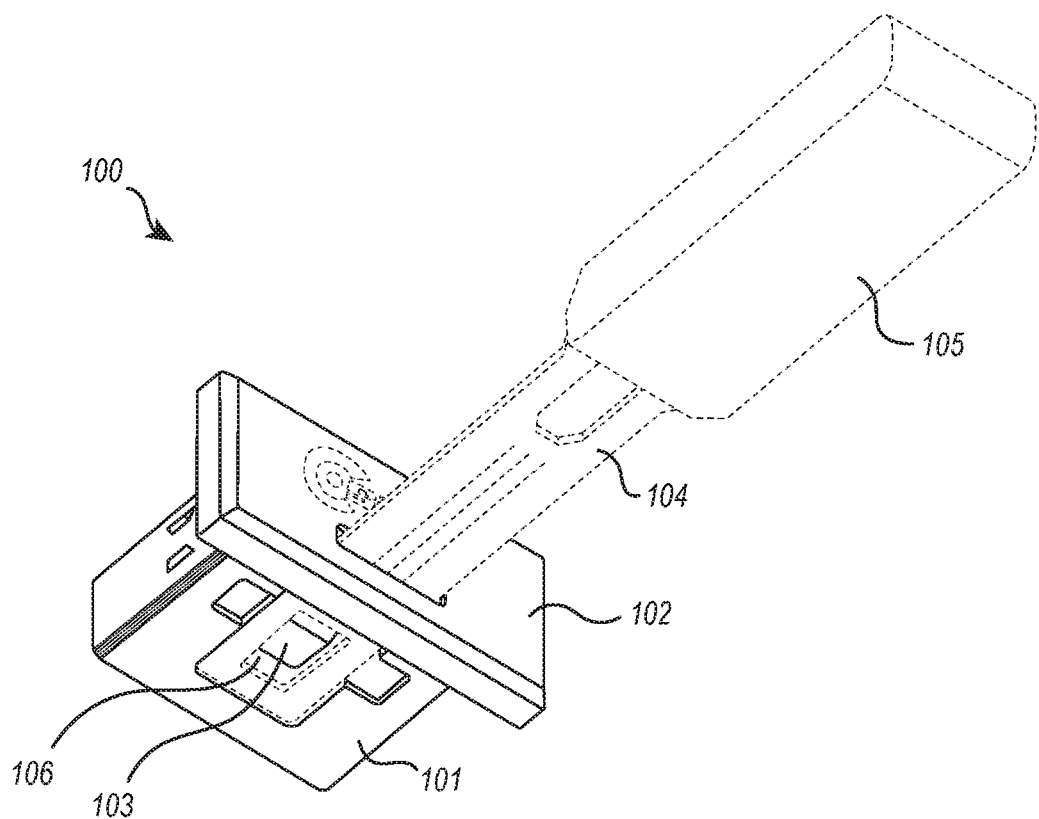
FIGS. 2A-2J illustrate various views of a system for locking and unlocking a physical port or socket of an electronic device with a key.
Figure 2B:
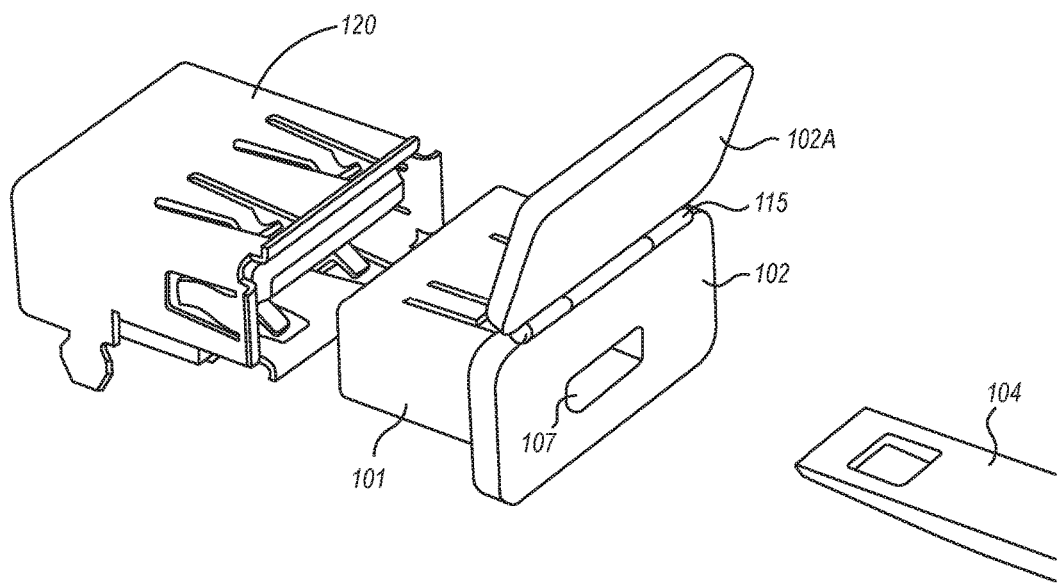
Figure 2C:
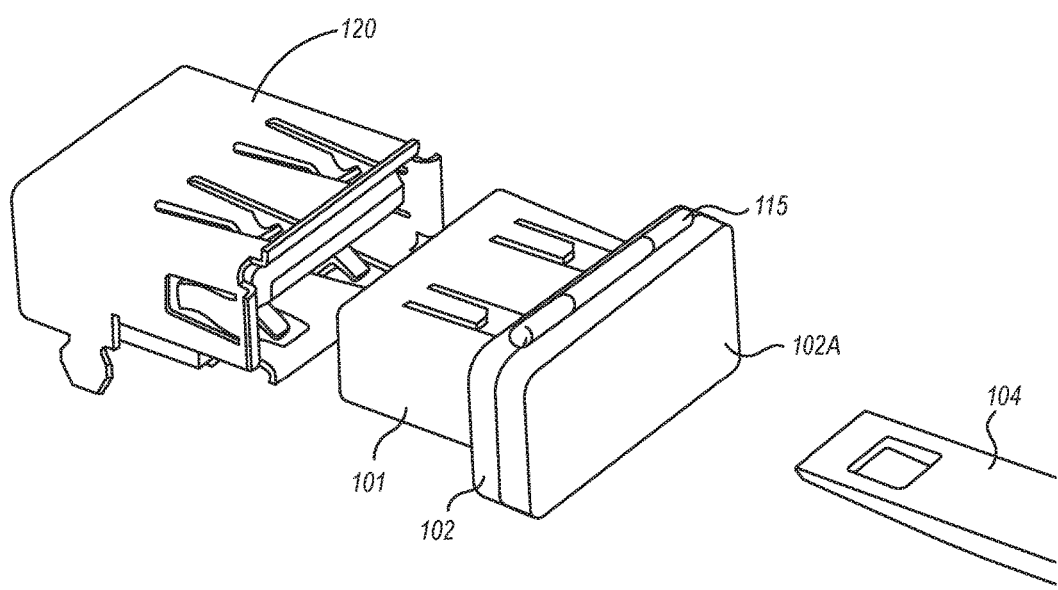
Figure 2D:
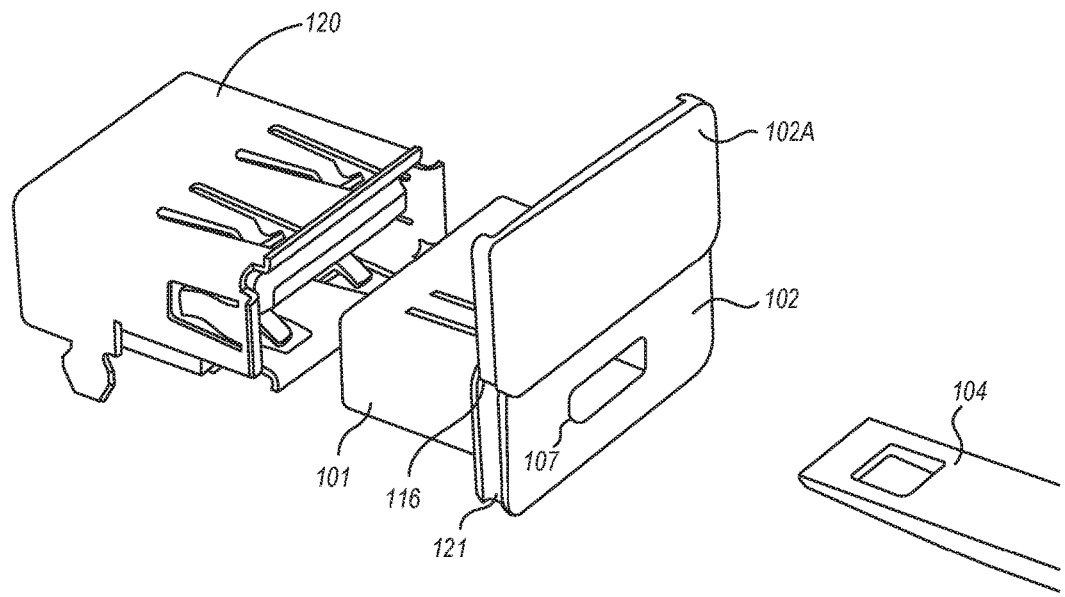
Figure 2E:
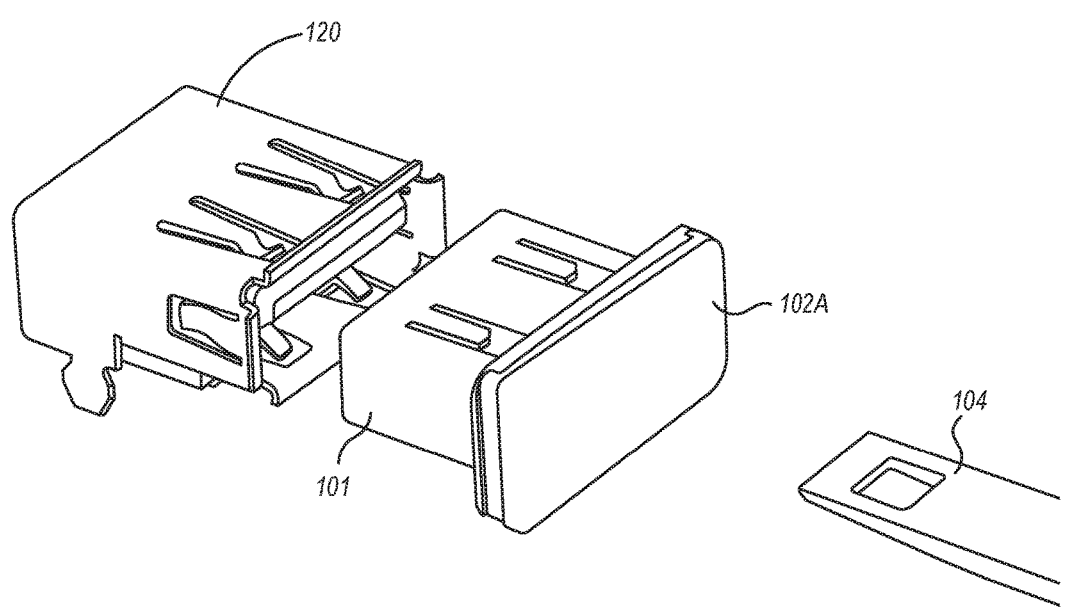

FIG. 2B illustrates an embodiment in which the exterior fascia itself (102) has a covering or lid (102A). The lid 102A may be attached to the exterior fascia 102 via a hinge (e.g. 115), via a snap connection, via a sliding connection 116 (as shown in FIG. 2D) or via some other connecting means. The lid 102A may be the same size and shape as the exterior fascia 102, or may be a different size or shape. The lid 102A is designed to prevent or allow access to the access port 107. For example, FIG. 2B illustrates an embodiment where the lid 102A is open, and FIG. 2C illustrates an embodiment where the lid 102A has been closed, thereby blocking access to the access port 107. Similarly, FIG. 2D illustrates an embodiment where the lid 102A has been slid to the open position using side rails 121, and FIG. 2E illustrates an embodiment where the lid has been slid to the closed position. The lid 102A may have a specialized coating that allows for decorative features to be printed or etched onto the face thereof. Once the lid 102A has been lifted upward (e.g. FIG. 2B), unsnapped, or slid upwards (e.g. FIG. 2D), the user may insert the key 104 through the access point and to the detent 103 (as shown in FIG. 2E).

Figure 2F:
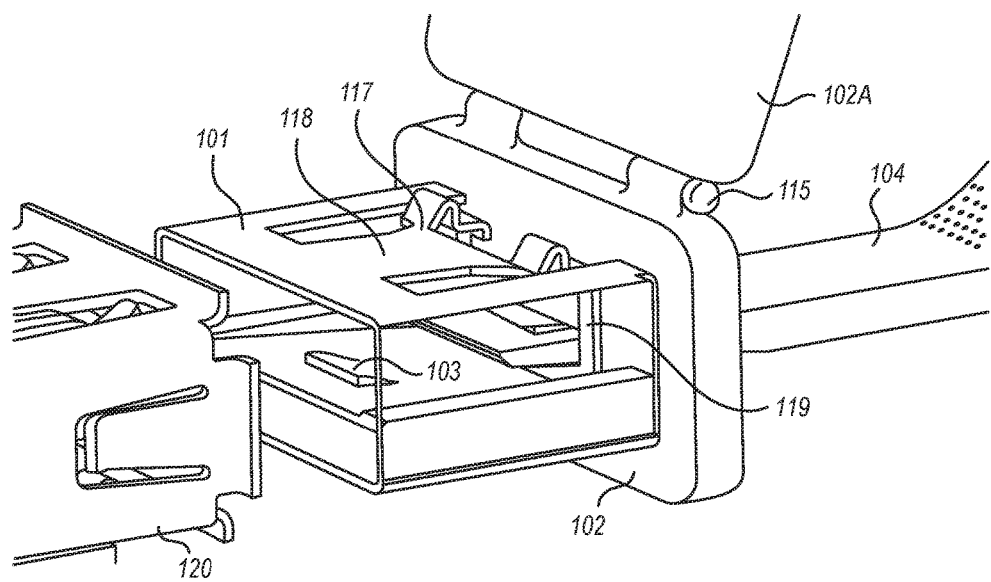
Figure 2G:
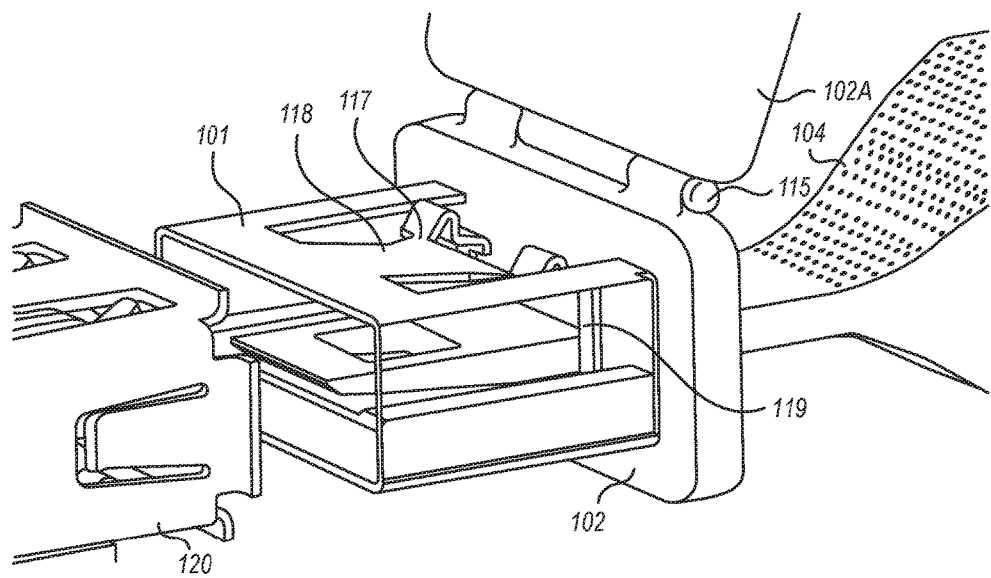
Figure 2H:
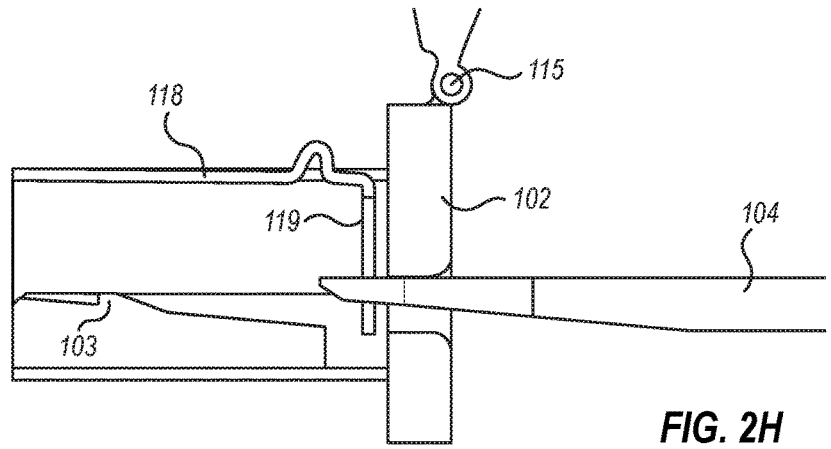
Figure 2I:
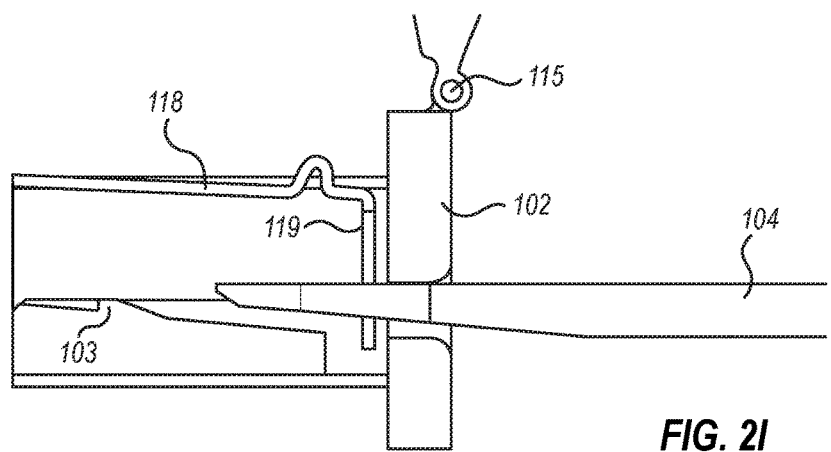
Figure 2J:
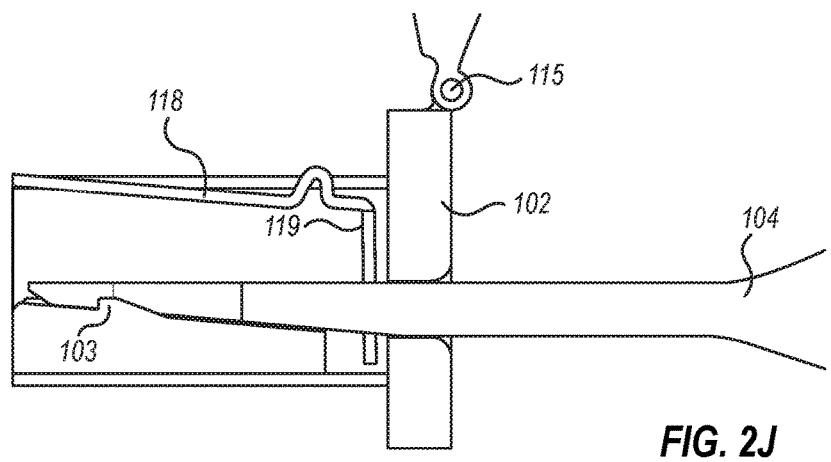

Indeed, as illustrated in FIG. 2F, the key 104 may be inserted through the access port 107 toward the detent 103. A tension element 117, which is part of the port lock body 101, may include a tension bar 118 and an outer lip 119 connected to the tension bar. The outer lip 119 extends below the access port 107 allowing the key 104 to slide over the outer lip. As shown in FIGS. 2F-2J, as the key 104 is inserted in through the access port 107 towards the detent 103, the key contacts the outer lip 119 of the tension element 117 and pulls the tension element downward. FIGS. 2H, 2I and 2J show a side view of the key 104 being inserted and the tension element 117 being drawn downward. This downward force holds the key 104 over the detent 103 and allows the port lock 100 to be removed from the port 120.

In other embodiments, instead of including a lid or other covering, the exterior fascia itself may act as a lid with a hinged or sliding connection directly to the body 101 of the port lock 100. In such cases, the exterior fascia 102 may have no access port, and access to the detent 103 is provided by lifting the exterior fascia 102 via its hinged connection (e.g. similar to the hinged connection shown in FIG. 2B). Alternatively, access to the detent 103 may be provided by sliding the exterior fascia 102 upwards via side rails 121 (e.g. similar to the sliding connection 203 shown in FIG. 11A).

Figure 3A:
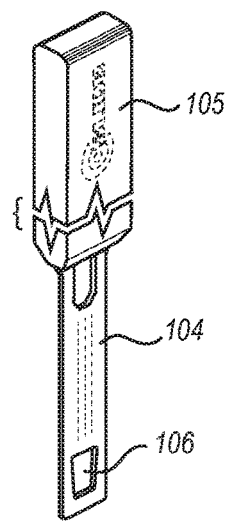
FIGS. 3A-3G illustrate various views of a first embodiment of a key for unlocking a port or socket of an electronic device.
Figure 3B:
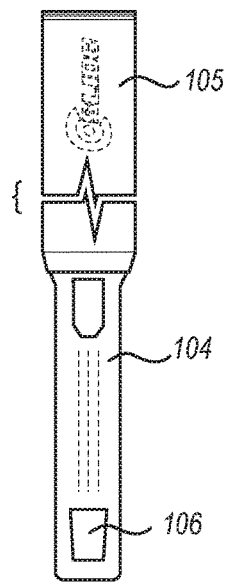
Figure 3C:
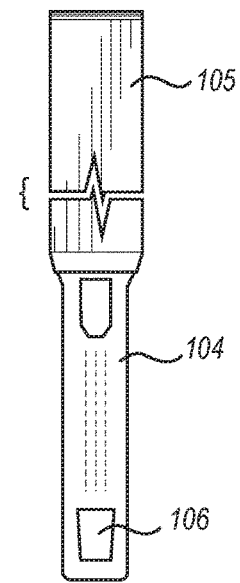
Figure 3D:
Figure 3E:
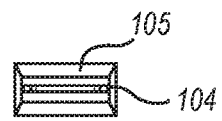
Figure 3F:
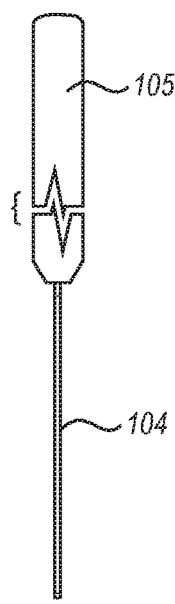
Figure 3G:
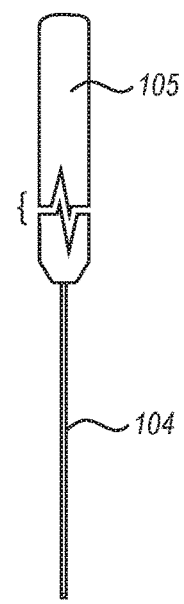
Figure 4:
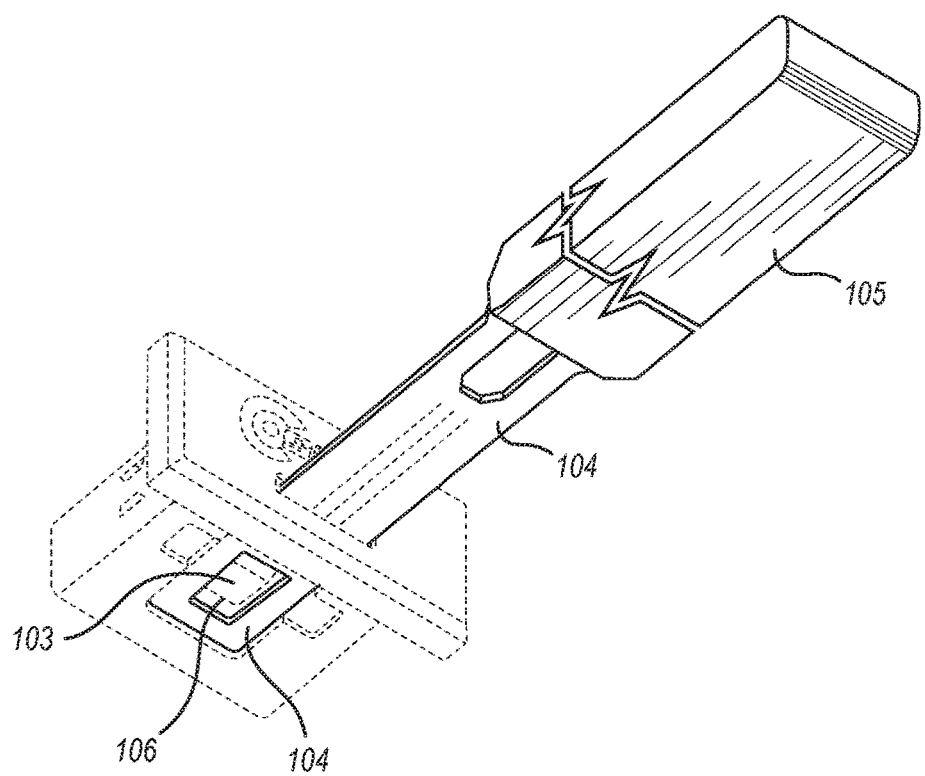
FIG. 4 illustrates a front perspective view of an embodiment of a system for locking a physical port or socket of an electronic device with the key of FIGS. 3A-3G.

FIGS. 3A-3G illustrate different views of an example key 104. The key includes a handle 105 and an elongated portion with one or more cavities 106. These cavities are designed to interact with and release the detents 103 in the lock 100. FIG. 3A illustrates a front perspective view of the key, FIG. 3B illustrates a front facing view of the key, FIG. 3C illustrates a back facing view, and FIGS. 3D-3G illustrate top, bottom, left side and right side views, respectively. FIG. 4 illustrates an embodiment in which a key 104 is inserted into a lock, such as lock 100 from FIG. 1A. The key 104 slides through the exterior fascia 102 via an access port 107. The access port 107 is sized to allow a key of specified size and shape to slide through and access the detent(s) 103. Once the key has been fully inserted, the detent no longer holds the lock 100 in place, and it can be removed from the port, thereby allowing physical access to the port.

Figure 5D:
Figure 5E:
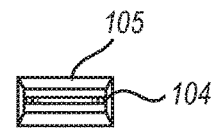
Figure 5F:
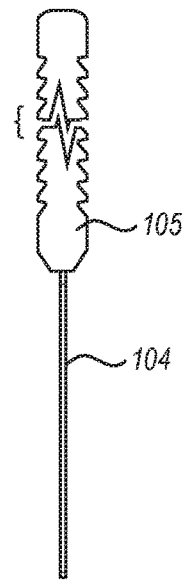
Figure 5G:
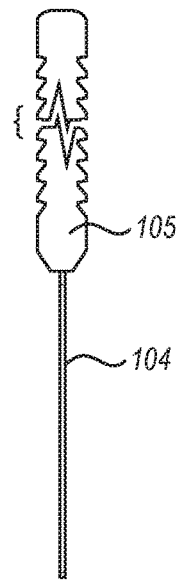
Figure 6:
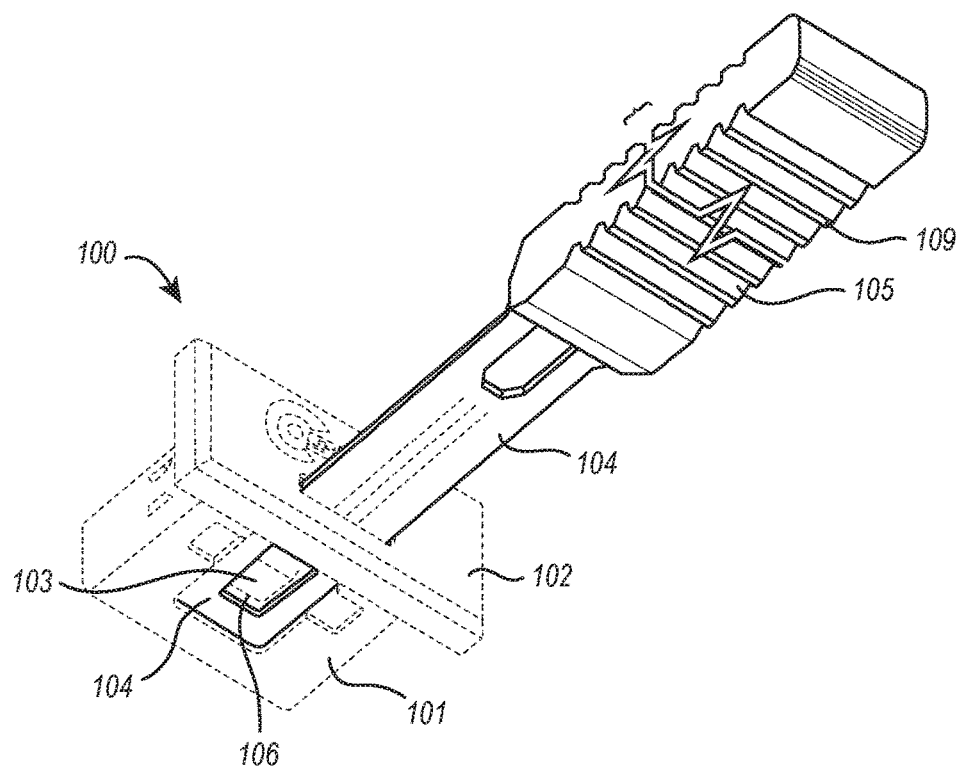
FIG. 6 illustrates a front perspective view of an embodiment of a system for locking a physical port or socket of an electronic device with the key of FIGS. 5A-5G.
Figure 7A:
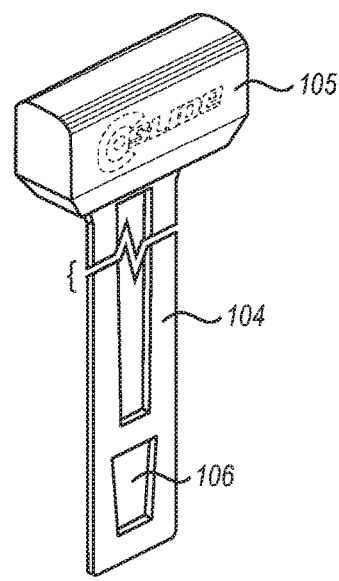
FIGS. 7A-7G illustrate various views of a third embodiment of a key for unlocking a port or socket of an electronic device.
Figure 7B:
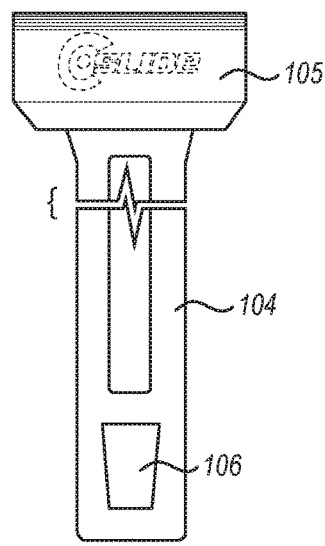
Figure 7C:
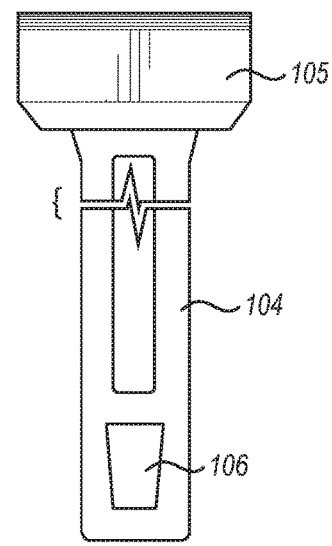
Figure 7D:
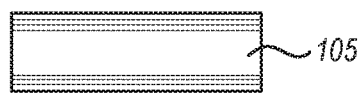
Figure 7E:
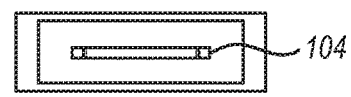
Figure 7F:
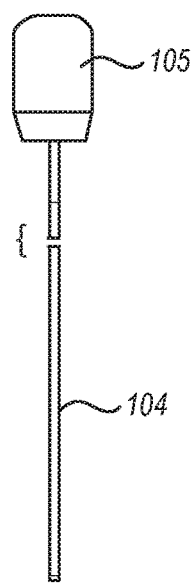
Figure 7G:
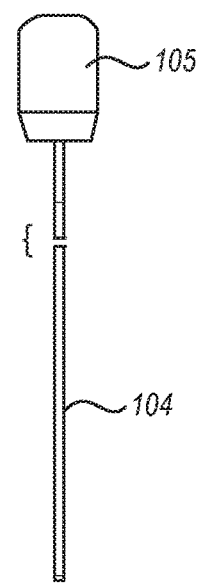

FIGS. 5A-5G illustrate an alternative embodiment of a key 104. In this embodiment, the handle 105 has multiple ridges 109 that provide better grip for a user. For instance, when a user is pushing or pulling on a key, the ridges 109 in the embodiment of FIGS. 5A-5G will keep the user's fingers from slipping off of the handle 105. As in FIGS. 1 and 3, FIG. 5A illustrates a front perspective view, FIG. 5B illustrates a front facing view, FIG. 5C illustrates a back facing view, and FIGS. 5D-5G illustrate top, bottom, left side and right side views, respectively. As in FIG. 4, the key 104 of FIG. 6 is inserted into a lock 100 to release the detent 103 and remove the lock from the port or socket.

Figure 8:
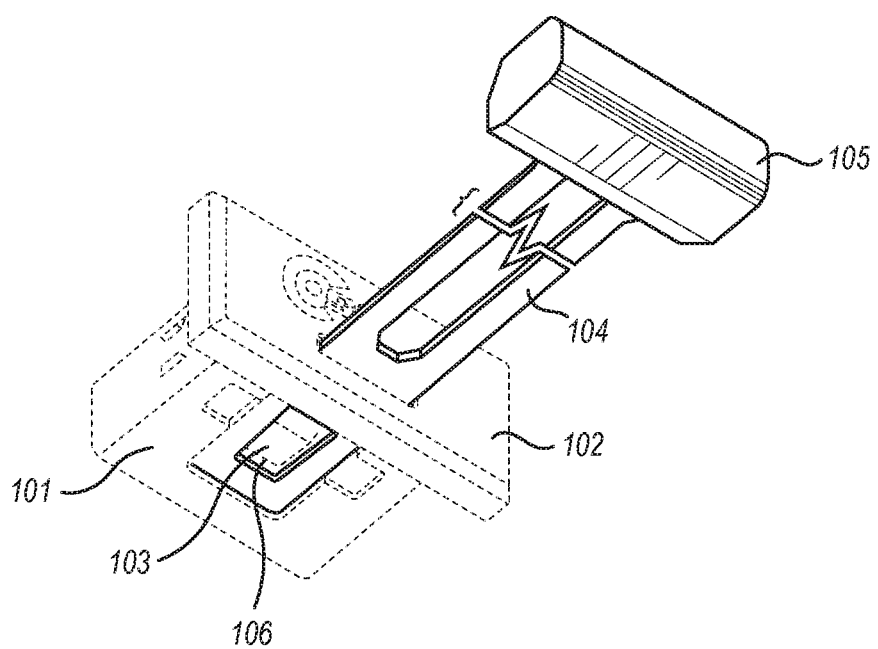
FIG. 8 illustrates a front perspective view of an embodiment of a system for locking a physical port or socket of an electronic device with the key of FIGS. 7A-7G.

FIGS. 7A-7G illustrate front perspective, front facing, back facing, top, bottom, left side and right side views of another embodiment of a key 104. This key has a handle 105 that allows words, logos or pictures to be printed on the front or back facing sides of the exterior fascia 102. Although shown as only having printing on the front side, it will be recognized that the handle 105 may include printing on the top side, back side or front side. The printing may be used to customize the key for a given user, or to provide a corporate logo for branding purposes. The key 104 is shown as being inserted face up in FIG. 8; however, in at least some embodiments, the key may be reversible, allowing the key to function whether inserted facing up or facing downward.

Figure 9A:
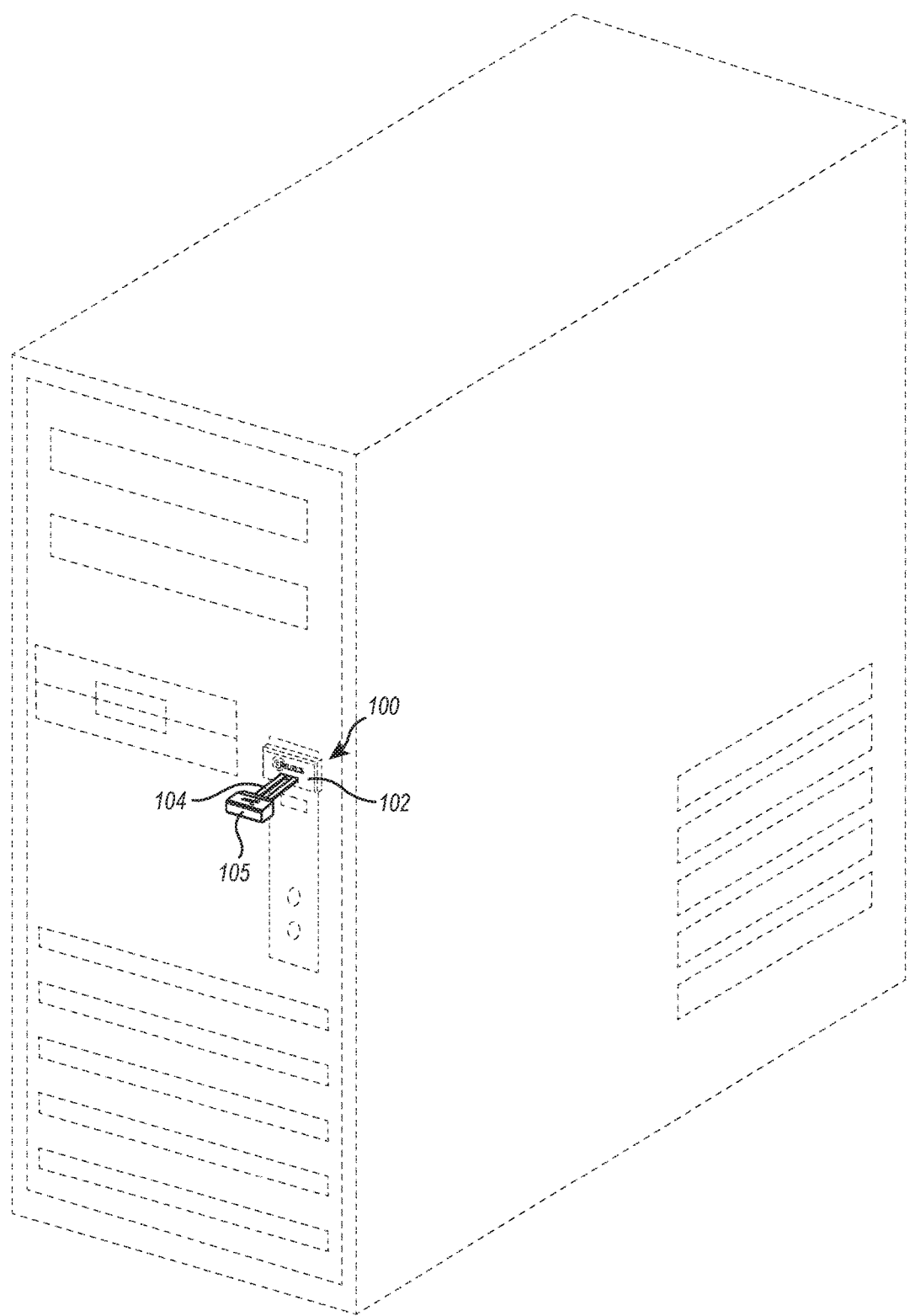
FIG. 9A illustrates a front perspective view of an embodiment in which a lock and key are inserted in to a port on a stationary electronic device.
Figure 9B:
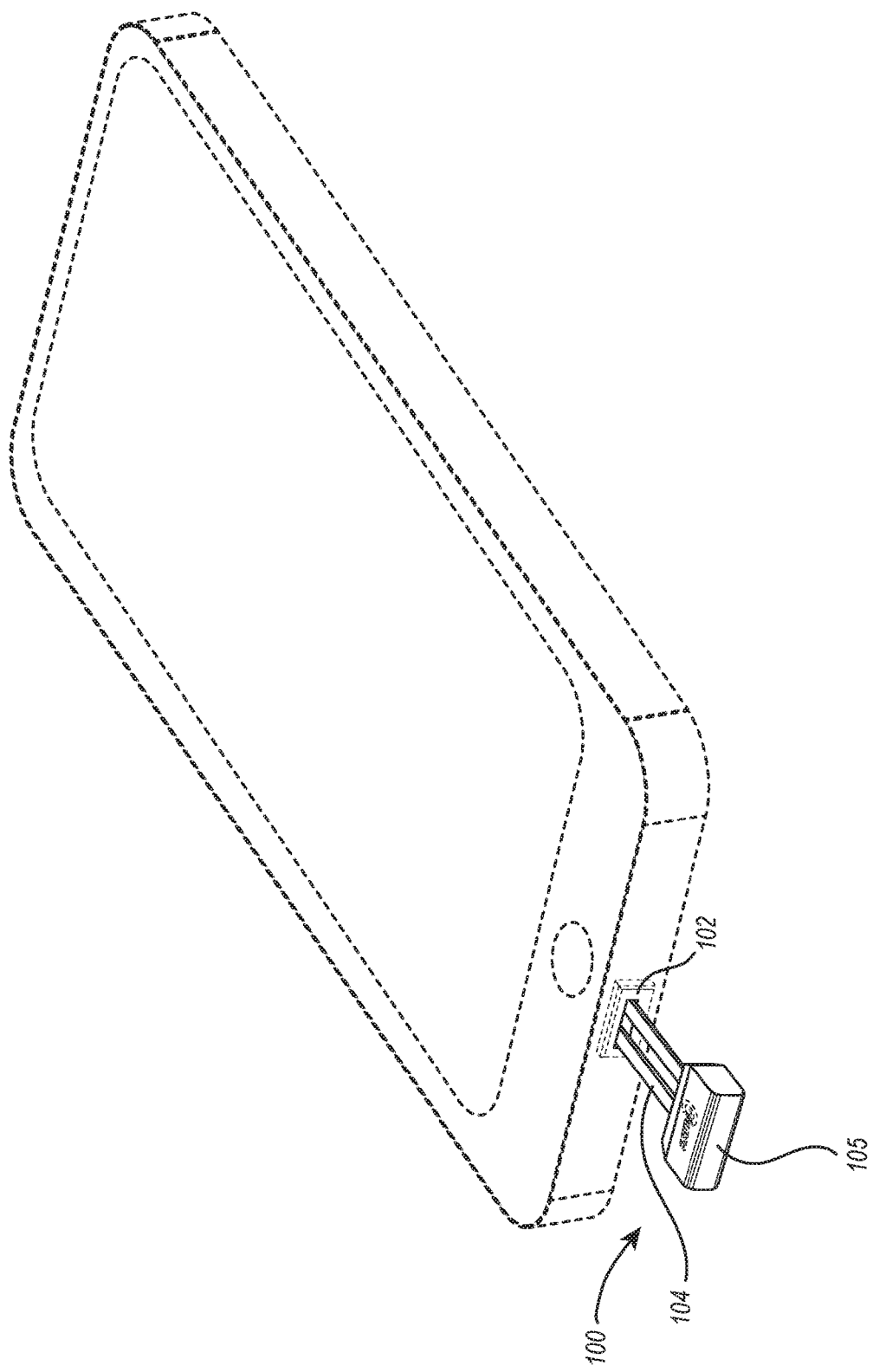
FIG. 9B illustrates a front perspective view of an embodiment in which a lock and key are inserted in to a port on a mobile electronic device.

FIG. 9A illustrates an embodiment in which the lock 100 is inserted into a port such as a USB port on a stationary personal computer. The key 104 is also being inserted into the lock 100 to release the detents that hold the lock in place over the port. Similarly, in FIG. 9B, a lock 100 is inserted into a port on a mobile phone. Using such a lock, a user can prevent a malicious user from accessing their charging port, data port, microphone port (as further shown in FIGS. 14A-14E), or other type of port. This provides a higher level of security for the device, because even if a malicious user were to obtain physical access to the user's device, the malicious user would still not be able to interface with the device, except through the native touchscreen, which would presumably have password or biometric protection.

Figure 10A:
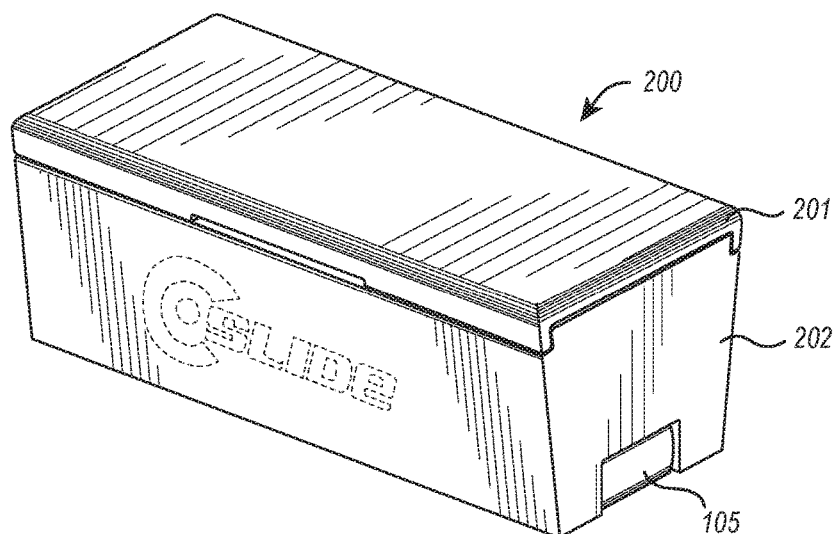
Figure 10B:
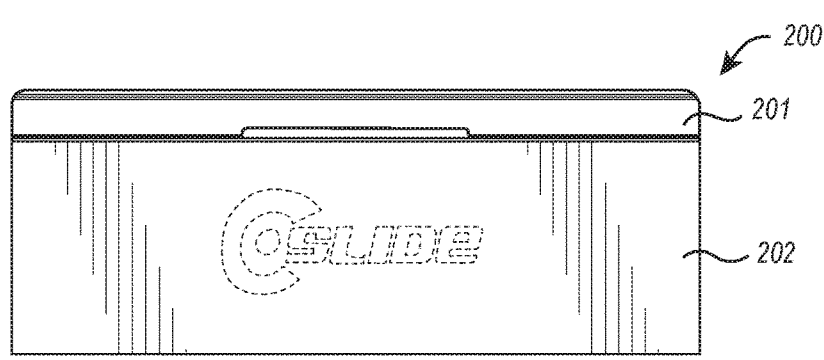
Figure 10C:
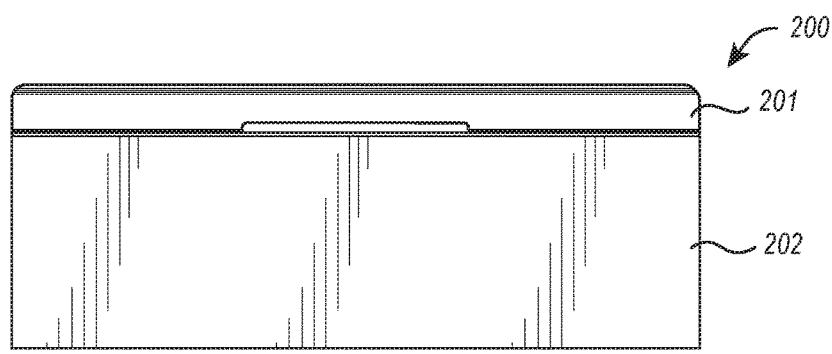

FIGS. 10A-10G illustrate embodiments of a storage box that is configured with sufficient size and depth to hold both the port lock(s) and key(s) when not in use. For example, if a user had a plurality of port locks, the user could store the port locks in the storage box 200. The storage box has a lid 201 and a main body 202. The lid may be transparent or opaque, and may have a printable surface so that words, logos or pictures can be printed thereon. Similarly, the sides of the storage box may have printable surfaces or may be suitable to have printed coatings applied thereon. FIG. 10A illustrates a front perspective view, FIG. 10B illustrates a front facing view, FIG. 10C illustrates a back facing view, and FIGS. 10D-10G illustrate top, bottom, left side and right side views, respectively.

As can be seen in FIGS. 10A, 10E and 10G, a key 104 may be placed within the storage box. A cavity may be provided on the bottom of the storage box 200, as shown in FIG. 10E, that allows the key 104 to be inserted therein. In some embodiments, the key 104 may unlock a separate detent within the storage box itself that allows the lid 201 to be opened. Thus, the storage box 200 and its contents may be locked unless accessed using the key 104 (or using a separate key unique to the storage box).

Figure 11A:
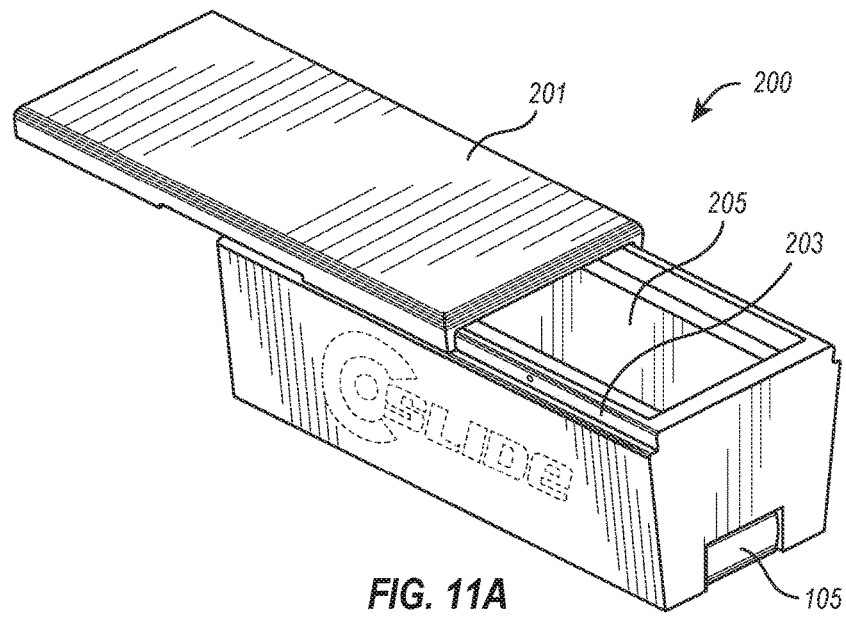
FIGS. 11A-11C illustrate various views of embodiments of a storage box, with a sliding lid or a hinged lid.
Figure 11B:
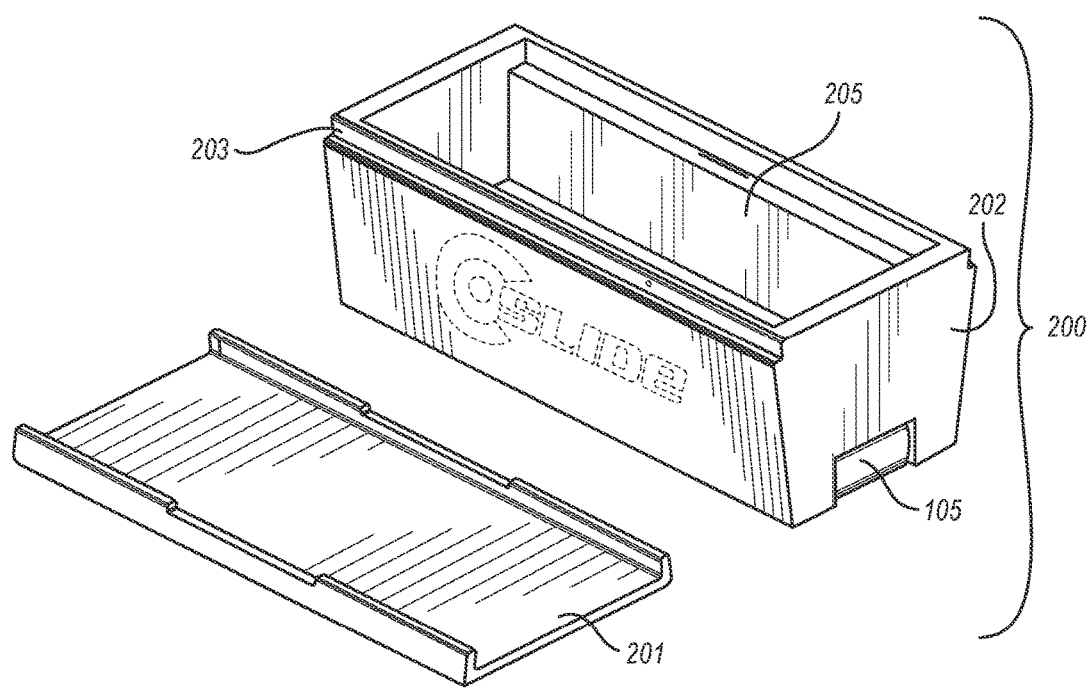
Figure 11C:
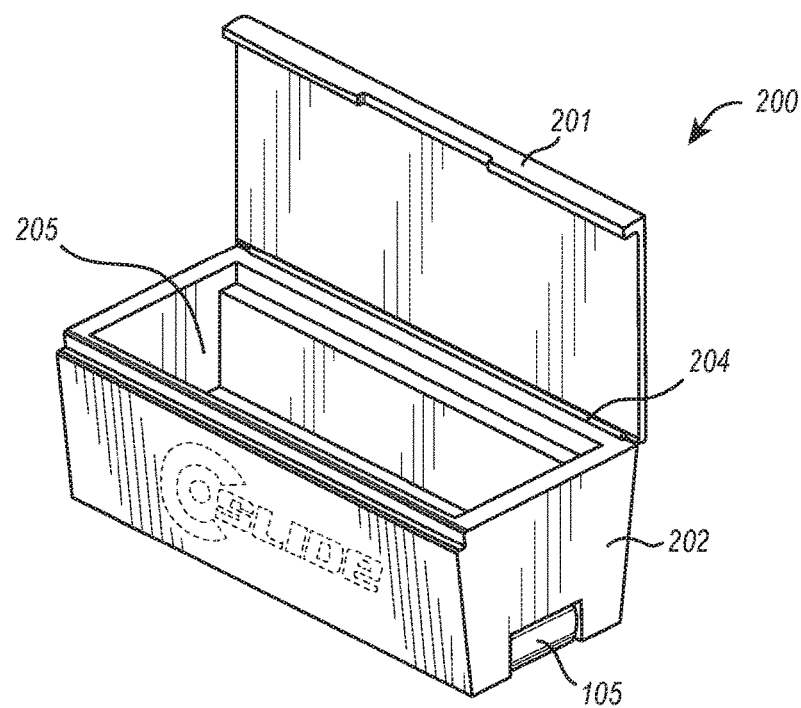
Figure 12A:
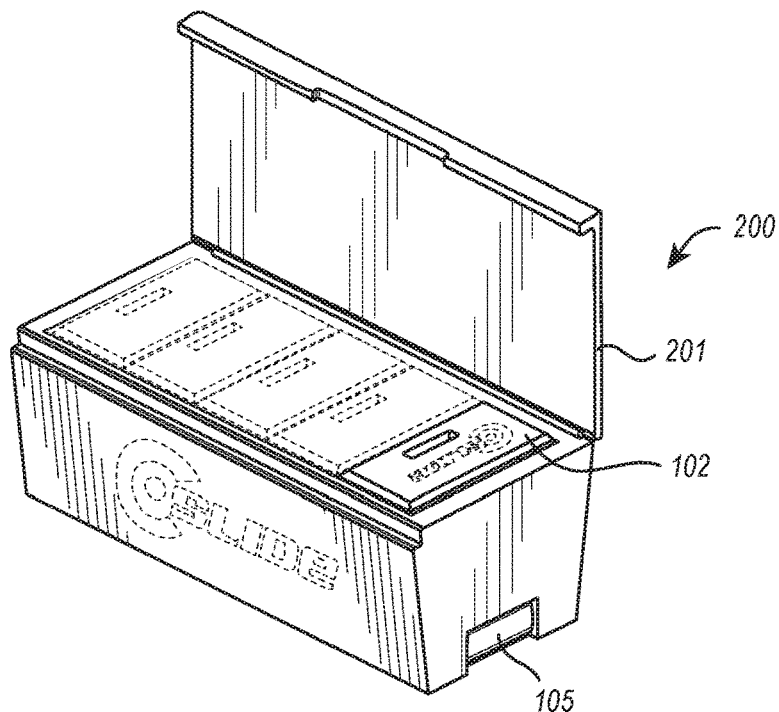
FIGS. 12A-12G illustrate various views of an embodiment of a storage box with port locks stored therein.

The illustrated implementations of FIGS. 11A, 11B and 11C show an internal cavity 205 of the storage box 200 into which the user can load the locks (as shown in greater detail in FIG. 12A). The internal cavity 205 may be designed to hold a specific type of lock, or may be designed to hold many different types of locks. The lid 201 may slide from a closed position (as generally shown in FIG. 10A), to a partially open position (as shown in FIG. 11A) to a fully open position (as shown in FIG. 11B). The lid may slide on rails 203 between open and closed positions. As noted above, the lid may be prevented from moving out of a locked closed position by one or more detents that are released when the key 104 is inserted. When the key is inserted, the key handle 105 may remain accessible to a user to slide the key in or out of the recess.

In some embodiments, the lid 201 may be hingedly connected to the storage box body 202. As shown in FIG. 11C, the hinge 204 allows the lid to be lifted from a closed position to an open position while the lid remains attached to the storage box. As with the rails embodiment in which the lid slides on and off of the storage box, the hinge embodiment may also include detents which secure the lid 201 when it is closed. These detents may be released when the key 104 is inserted into the storage box 200.

Figure 12B:
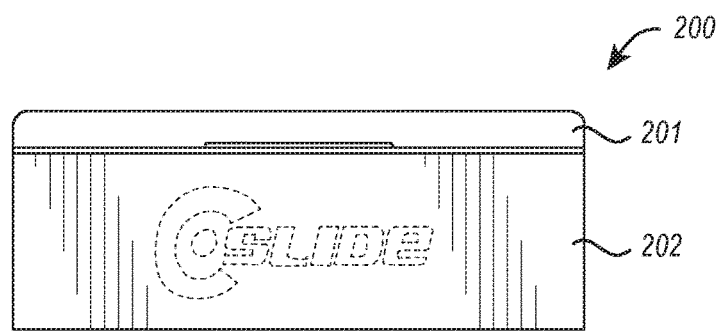
Figure 12C:
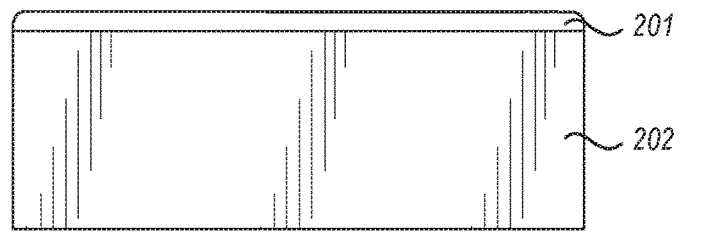
Figure 12D:
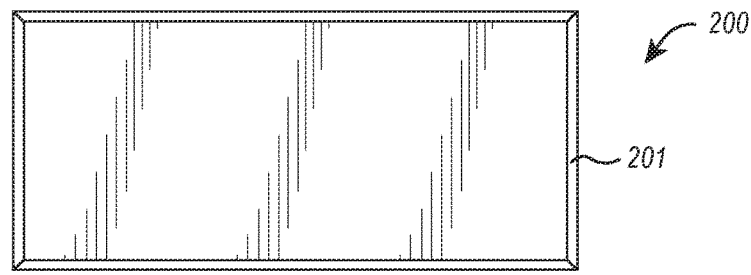
Figure 12E:
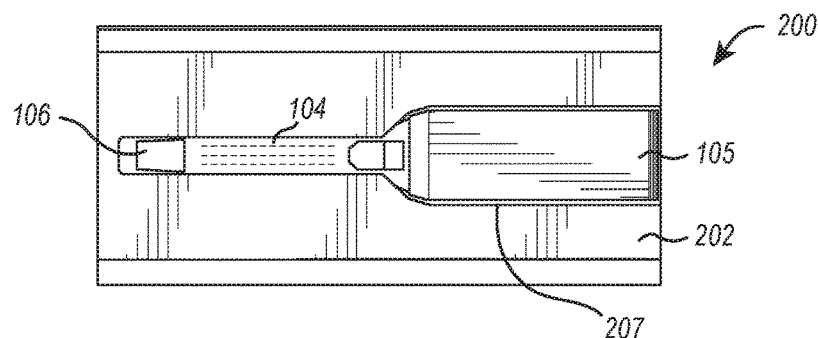
Figure 12F:
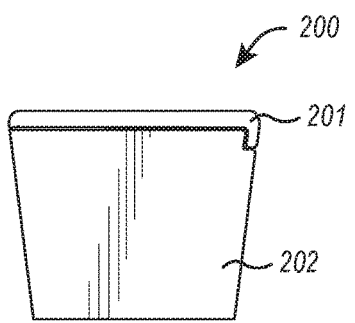
Figure 12G:
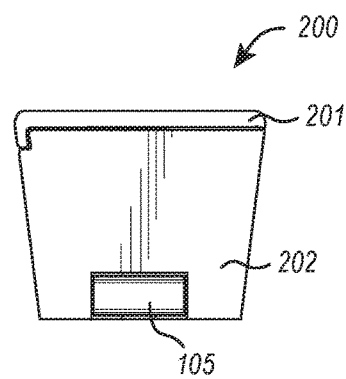

FIGS. 12A-12G illustrate various views of embodiments of a storage box, showing an enclosed lock and key. The storage box 200 is shown in an open position with the locks (or at least the exterior fascia thereof) visible to a user. In addition, the storage box 200 can include an underside recess 207 that enables the user to press or otherwise slide or insert a key into the storage box. The key may slide into a snap fit or other friction fit location. The underside recess 207 may function merely as a storage location for the key, or may be function in that the key 104, when inserted, releases detents in the storage box body 202 that secure the lid 201. FIG. 12A illustrates a front perspective view of the storage box 200, FIG. 12B illustrates a front facing view of the storage box, FIG. 12C illustrates a back facing view of the storage box, and FIGS. 12D-12G illustrate top, bottom, left side and right side views, respectively.

One will appreciate, of course, that the storage box 200 can be varied in any number of shapes and configurations. For example, a manufacturer can also vary the storage box 200 so that the user places the key 104 inside the storage box cavity 205 (instead of the locks), and places the locks in an outer attachment recess 207 that is designed for a pressure or snap fit with a lock. This could enable the user to add and remove locks 100 from the storage box 200 without having to remove the lid 201. In addition, the manufacturer can configure the lid and outer surfaces of the storage box 200 to print logos or other forms of indicia thereon. Thus, the illustrated storage box 200 can provide a mix of design and functional benefits, such as branding and advertising benefits, and make the components of the present invention particularly suited for corporate gifts.

Accordingly, one will appreciate that at least one implementation of the inventive storage box comprises sufficient length, width, and depth to hold multiple locks along a length that is at least as long as the length of a key (e.g. a USB key). Of course, a manufacturer can vary the size, height, depth, length, width, and so on as appropriate, as well as any shape, curvature, or angling of the storage box.

Figure 13:
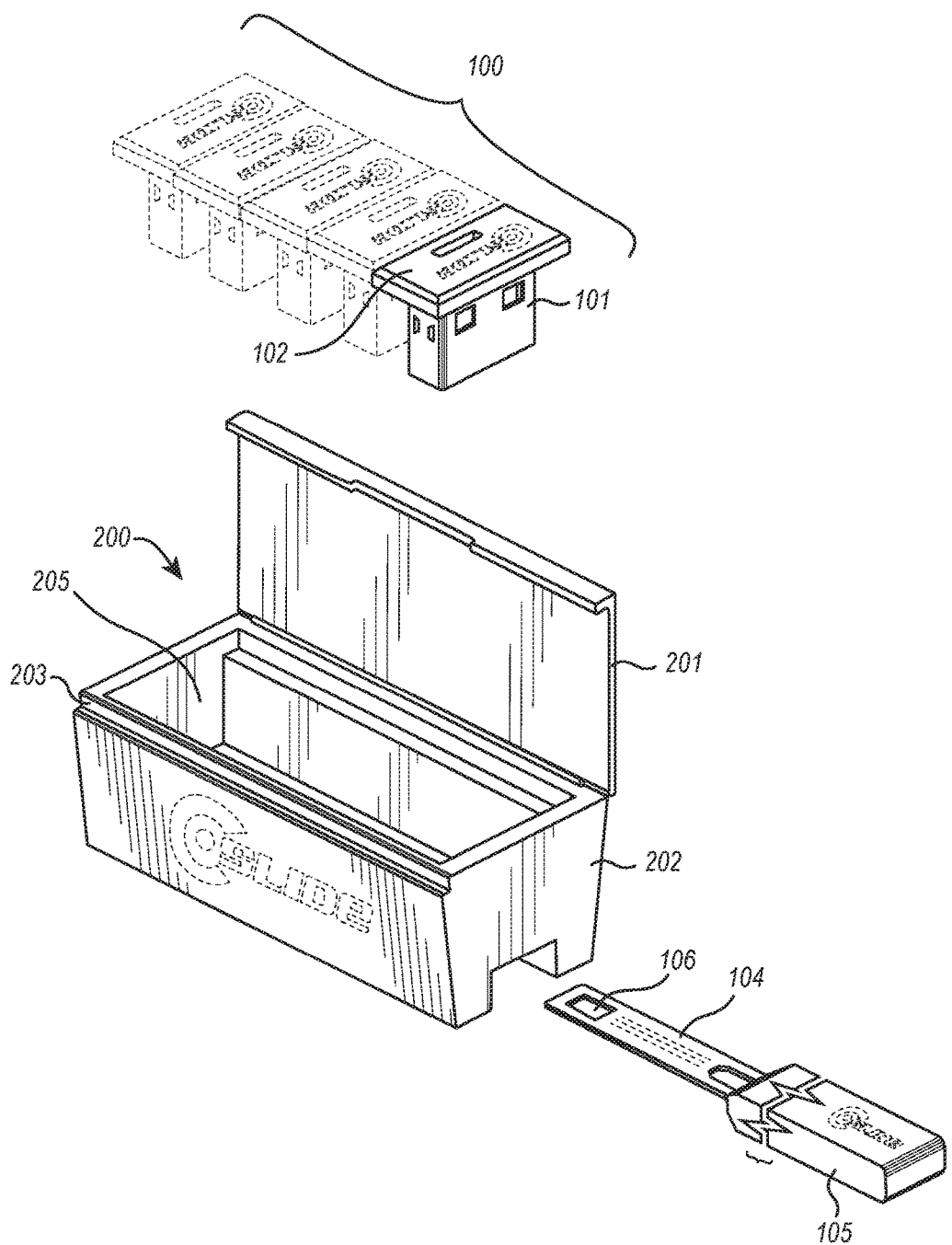
FIG. 13 illustrates a front perspective view of a storage box into which port locks are inserted, and into which a key is also inserted.
Figure 14A:
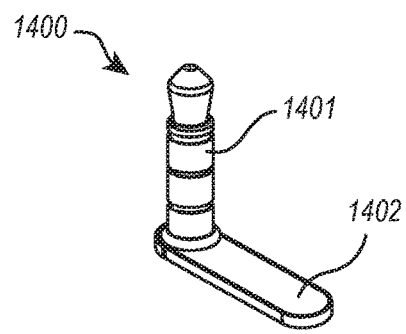
FIGS. 14A-14E illustrate various views of embodiments of a microphone jack lock.
Figure 14B:
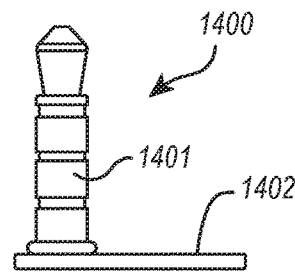
Figure 14C:
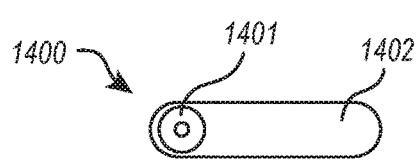
Figure 14D:
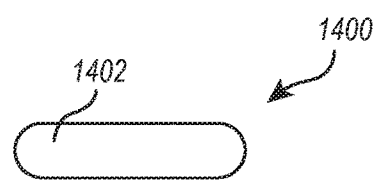
Figure 14E:
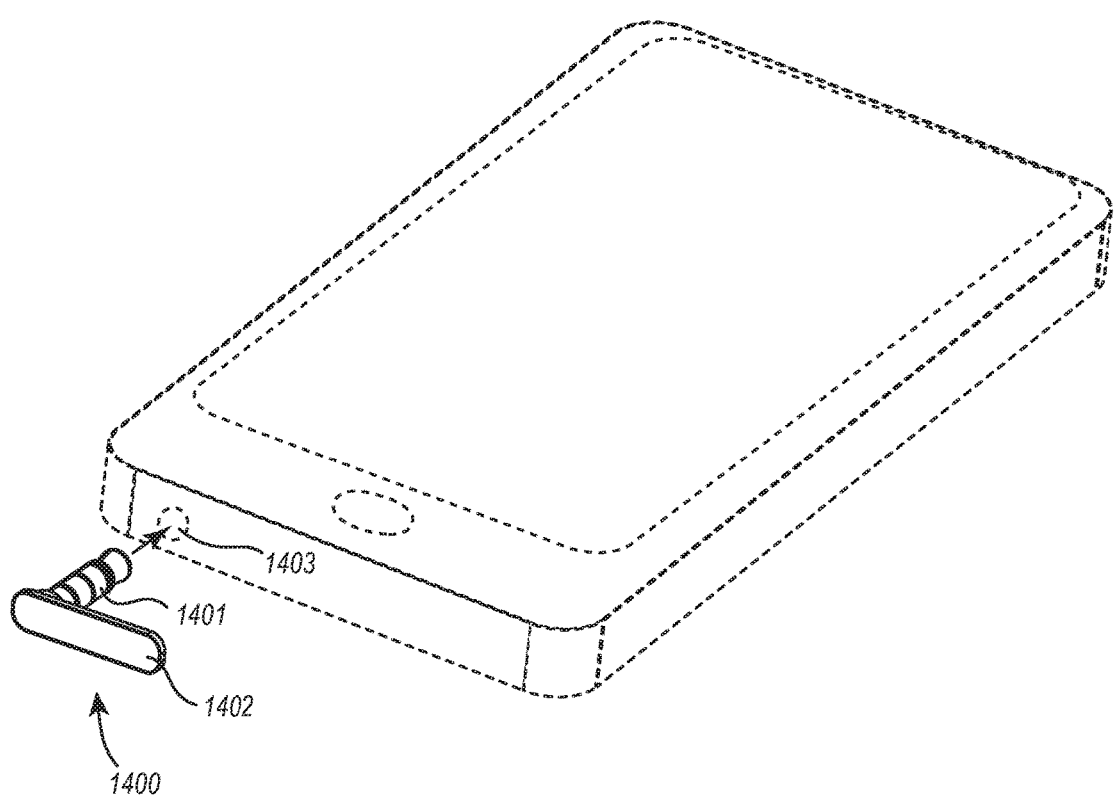

FIG. 13 illustrates an embodiment in which multiple locks (100) may be inserted into a storage box. For instance, the storage box 200 may be designed to fit five USB locks. The five USB locks may be placed in the internal cavity 205. The key 104 may also be placed in the outer attachment recess 207 for storage. In some embodiments, the storage box 200 may include multiple internal cavities 205 to store multiple different locks, and/or may include multiple outer attachment recesses 207 to store multiple different keys.

FIGS. 14A-14E illustrate an alternative embodiment of a port lock. Specifically, FIGS. 14A-14E illustrate a microphone port lock 1400 (or more generally, an audio port lock) with a male interface portion 1401 and an external fascia 1402. The male interface portion 1401 can be inserted into a microphone jack (e.g. 1403) of a mobile device or other electronic device that has a microphone jack. When the microphone jack is inserted into an electronic device such as a mobile phone, the mobile phone will interpret the port lock 1400 as a device such as headphones or a microphone. Because the mobile phone is interpreting the microphone lock 1400 as a device, microphone functions that listen for the user's voice on the mobile phone will be disabled. This provides the user of the mobile phone an added measure of protection against a malware program that is designed to turn on the phone's microphone and surreptitiously listen to the current surroundings. If the user receives a phone call and wishes to use the mobile phone's microphone to speak to the other party, the user can simply remove the microphone lock 1400 and the mobile phone's microphone will be re-enabled.

Figure 15:
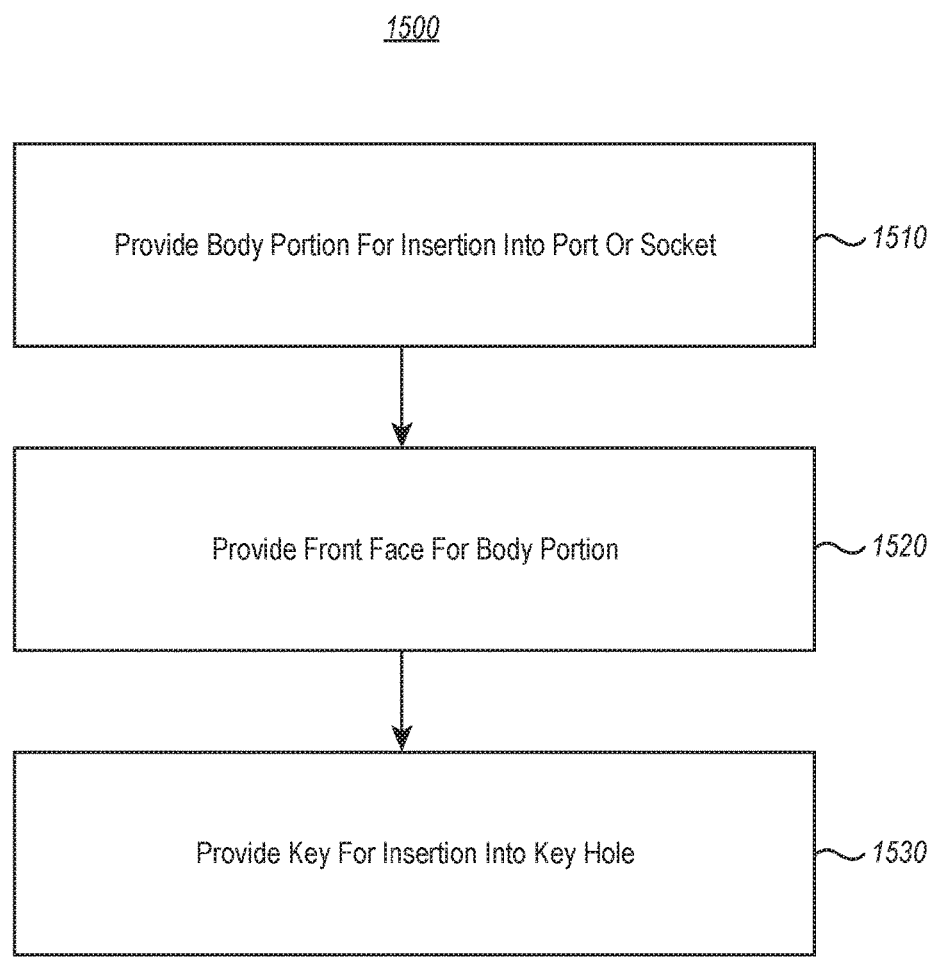
FIG. 15 illustrates an embodiment of a method for manufacturing a lock for use with a port or socket of an electronic device.

In another embodiment, a method of manufacturing a lock is provided for use with a port or socket of an electronic device. For example, method 1500 of FIG. 15 illustrates a method of manufacturing a lock for use with a port or socket of an electronic device. This method 1500 includes providing a body portion (e.g. 101 of FIG. 1A) that is configured for insertion into a port or socket (step 1510). The body portion 101 has recesses or detents 103 for securing the body portion within the socket. As used herein, the term "providing" may include generating, building, producing or otherwise creating an object or element. Thus, providing a body portion may include generating, building or producing the body portion with the specified features and components.

The method 1500 further includes providing a front face for the body portion, where the front face has a planar portion sufficient for receiving human-readable (e.g. printed) indicia (step 1520). The front face further includes a key hole 107 for receiving a key. The front face (e.g. 102) has a surface on which words, logos or pictures may be printed or etched. The front face may be fixedly attached to the body portion, or may be separably attached. The method of manufacturing 1500 also includes providing the key for insertion into the key hole of the front face (step 1530). The key (e.g. 104) may thus be inserted into key hole 107 to release one or more detents 103 holding the lock in place within the port or socket. The key 104 is configured to release the body portion 101 from within the port or socket upon depression.

In some embodiments, where the front face is separably attached, or is slidably attached, the front face may include one or more rails on which the front face slides between first and second positions. For instance, the front face may slide between an open position and a closed position. In one example, the front face does not include a key hole 107. In such cases, the key hole may be hidden behind the front face, and may only be accessible when the front face has been slid to the open position. When slid to the closed position, the key hole is no longer visible. This may provide an added layer of security to the lock 100.

Additionally or alternatively, the front face 102 may be hingedly attached to the body portion 101. The method 1500 may include providing hinges on which the front face is configured to swing between a first open position and a second closed position. In this embodiment, the front face 102 may have no key hole 107 and, thus, the key hole 107 that is part of the body portion 101 is hidden by the front face. The key hole may be accessed, however, by lifting the front face 102 which pivots on a hinge (e.g. similar to hinge 115 of FIG. 2B or hinge 204 of FIG. 11C) from a closed position to an open position. Once accessed, the key may be inserted into the key hole and positioned to the detent to release the lock. Locks with hinged faces or sliding faces may be configured for securing all types of physical ports and socket including USB ports, display ports, HDMI ports, Ethernet ports, Firewire ports, Lighting ports, optical interfaces or other types of physical electronic connection interfaces.

In one specific embodiment, a USB lock system is provided for locking USB ports on an electronic device. Such a USB lock system includes a USB lock for insertion into a USB port (e.g. port 120 of FIG. 2B). The USB lock includes a structural interface member (e.g. 101) that has a cavity for alignment with a USB port. The USB lock also includes an exterior fascia (e.g. 102) that is affixed to the structural interface member, and a detent that holds the USB lock in place within the USB port. The USB lock system also includes a key for disengaging the USB lock. Optionally, the USB lock system may have a storage box (e.g. 200 of FIG. 10A) for holding the USB lock and the key simultaneously.

Other specific locking systems such as the audio port locking system of FIG. 14 may include similar or different features. Each locking system may be customized for ports that have different types of interfaces. For example, some ports have male interfaces, while other ports have female interfaces. Thus, the locking system may have a cavity for alignment with ports or sockets having male interfaces, or may have a protruding portion for alignment with ports or sockets having female interfaces. The exterior fascia may have printed thereon an indication of what type of port the locking system is to cover. Moreover, each different type of locking system may have a different type of detent or latching mechanism that keeps the lock securely held in place. In one embodiment, the structural interface member of the lock is a female USB port interface for alignment with a male USB port interface. In another embodiment, the structural interface member is a male audio jack for alignment with a female audio jack interface.

The structural interface member 101 of the lock 100 in FIG. 1A, for example, may include depressions, cavities, bumps, knobs or other features that interface with the key to unlock and release the lock. The key may have similar depressions, cavities, bumps, knobs or other features that correspond with the features of the lock. Once snapped into place within a port or socket, the lock cannot be pulled out without a key. The exterior fascia includes a cavity or key hole through which the key is inserted and interfaced with the detent in the structural member of the lock. A rubber, plastic or other type of flange may be used to cover the key hole. Alternatively, the key hole may not extend through the exterior fascia, and may only be accessible by repositioning the exterior fascia. The exterior fascia may be detachably affixed to the structural interface member using a single, long hinge, or using a plurality of smaller hinges. In some cases, the exterior fascia may include two separate doors that fold inward, each hingedly connected to the structural interface member. Variants of these types of connections are contemplated herein.

In one embodiment, the exterior fascia is detachably affixed to the structural interface member via one or more support rails mounted to the structural interface member that allow the exterior fascia to slide between open and closed positions. The exterior fascia slides on the rails from an open position that allows access to the port or socket to a closed position that prevents access to the port or socket. In some cases, the exterior fascia may be affixed to the structural interface member using an adhesive or semi-adhesive. The adhesive would fixedly attach the exterior fascia to the structural interface member, while the semi-adhesive would allow the exterior fascia to be removed and reattached as desired. In cases where a semi-adhesive is used, different exterior fascia may be swapped in and out by the user.

For example, in cases where a user is a fan of two different sports teams, the user could have two different exterior fascia that have each team's logo printed thereon. When the user tired of the one team, he or she could simply replace the exterior fascia with the other fascia. The exterior fascia may also be swapped in embodiments that use a rails connection that allows the fascia to slide on and off of rails.

The various locks, exterior fascia, keys and other parts may be held in a storage box. The storage box may include snap-fit connections for each piece. The snap-fit connections may be cut or molded for different sizes and shapes of lock and key hardware. The exterior of the storage box may include one or more planar interfaces or exposed areas designed to have logos or other human readable indicia printed thereon.

As understood from the specification, and Figures herein, in at least one implementation, the USB lock comprises one or more recesses, cavities, and detents that enable the USB lock to serve as a male interface that fits into a female interface of a computerized device consistent with the standard USB specification. One will appreciate that a manufacturer can adjust the shape, height, and other dimensions of the USB lock so that the lock fits into a traditional USB female interface/socket, and/or the vast array of other USB interfaces/sockets, such as those for mini-USB, micro-USB, USB-A, USB-B, USB-C, and so forth. Moreover, one will appreciate that, like the illustrated storage box and locking system, a manufacturer can also adjust the key handle and key stem for a variety of configurations.

In general, the key stem can be shaped and configured to fit within the keyhole of the facing view of the lock. In at least one implementation, the key comprises a planar interface having one or more recesses and detents that fit with a planar female interface, and against corresponding recesses and detents in the lock to release the lock from the physical port or socket. Additionally or alternatively, a manufacturer may configure the key (and male or female interface) with a more traditional pin tumbler, lever lock, or tubular key mechanism. Still further, the manufacturer can configure the lock with a combination lock, wireless or magnetic lock, or transponder type key system that may not necessarily require insertion of a physical key to remove the lock.

Accordingly, implementations of the present invention provide a number of advantages in the art of locking physical computerized interfaces. In addition to the foregoing, one will appreciate that the apparatus and system can be described in terms of one or more methods of use and/or manufacture.

In one implementation of a method of use, for example, a user pushes a lock (e.g. a USB lock or appropriate interface lock) into a corresponding USB port or socket of a computerized device. Upon insertion, one or more recesses and/or detents of the USB port grip the socket so that the USB lock cannot be removed from the socket. Upon desired use of the socket, the user inserts a key into a keyhole of the USB lock. The key releases one or more of the detents upon insertion, enabling the user to pull the USB lock out of the socket, and thereby freeing up the USB interface for use.

In another, alternative implementation of a method of manufacture or assembly, a manufacturer prepares a USB lock by providing a USB body consistent with the USB device specification for physical interfaces. The manufacturer further provides a front face for use with the USB body, where the front face includes a shape and an at least partly planar portion. The manufacturer further provides human readable indicia on the front face, such as branding or other logo information. The manufacturer can shape the front face as a square, rectangle, rounded shape, or other creative design to add character to the USB lock. Additionally or alternatively, the manufacturer provides a USB key comprising a grip. The manufacturer can shape the grip so that the grip is elongate, squared, circular, or the like, and/or comprises ridged surfaces for better gripping. Still further, the manufacturer can provide human readable indicia on the grip, including branding or other logo information.

A method of locking and unlocking a USB interface of a computerized device is also provided. The method may include inserting a USB body into a USB socket of the computerized device, where the USB body comprises one or more detents that grip and/or lock the USB body within the USB socket, whereby the USB body prevents access to the USB socket without a key. The method further includes inserting a key into a key hole of a front face of the USB body to thereby release the one or more detents of the USB body, and removing the USB body from the USB interface.

Accordingly, regardless of the type of physical port or socket used, the elements and systems described herein may be used to physically secure that port or socket. By securing an electronic device's physical ports, a user can close off access points that would otherwise be vulnerable to attacks by malicious users. Indeed, when a malicious user has physical access to a port, it is feasible that the malicious user may be able to download files, upload viruses, or otherwise access sensitive information. By physically blocking access to the ports using the locks described herein, users can ensure that such attacks are prevented. This makes the user's devices more secure, even in cases where the would-be attacker has physical access to the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A system for locking a physical port or socket of an electronic device, wherein the system comprises a USB locking system, comprising:
a lock for insertion into a port or socket of an electronic device, the lock comprising:
a structural interface member that is configured to align with a selected port or socket of the electronic device into which the lock is to be inserted;
an exterior fascia that is affixed to the structural interface member;
a detent that holds the lock in place within the port or socket;
a key for disengaging the lock; and
a lid that covers the cavity of the exterior fascia;
wherein the exterior fascia includes a cavity through which the key is inserted and interfaced with the structural member of the lock.

2. The system as recited in claim 1, wherein the exterior fascia is detachably affixed to the structural interface member using one or more hinges.

3. The system as recited in claim 1, wherein the exterior fascia is affixed to the structural interface member using an adhesive or semi-adhesive.

4. The system as recited in claim 1, wherein the structural interface member has a cavity for alignment with ports or sockets having male interfaces, or has a protruding portion for alignment with ports or sockets having female interfaces.

5. The system as recited in claim 1, wherein the structural interface member comprises a male audio jack for alignment with a female audio jack interface.

6. The system as recited in claim 1, wherein the structural interface member of the lock includes one or more depressions, detents or cavities that interface with the key to unlock the lock.

7. The system as recited in claim 6, wherein the key includes one or more depressions, detents or cavities that correspond with the depressions, detents or cavities of the lock.

8. The system as recited in claim 1, wherein the exterior fascia is detachably affixed to the structural interface member via one or more support rails mounted to the structural interface member that allow the exterior fascia to slide between first and second positions.

9. The system as recited in claim 8, wherein the exterior fascia slides on the rails from a first open position that allows access to the port or socket to a second closed position that prevents access to the port or socket.

10. A method of manufacturing a lock for use with a USB port or socket of an electronic device, comprising:
providing a body portion configured for insertion into a port or socket, wherein the body portion has one or more recesses or detents for securing the body portion within the port or socket;
providing a front face for the body portion, the front face comprising an at least partly planar portion sufficient for receiving human-readable indicia, and further including a key hole for receiving a key;
providing the key for insertion into the key hole of the front face, wherein the key is configured to release the body portion from within the port or socket upon depression; and providing a lid that covers the cavity of the exterior fascia;
wherein the exterior fascia includes a cavity through which the key is inserted and interfaced with the structural member of the lock.

11. The method of claim 10, further comprising providing one or more rails on which the front face is to slide between first and second positions.

12. The method of claim 10, further comprising providing one or more hinges on which the front face is configured to swing between a first open position and a second closed position.

13. The method of claim 10, wherein the body portion comprises an audio jack portion configured for insertion into an audio jack port.

14. The method of claim 10, wherein the lock and key are further configured for securing a physical port or socket corresponding to any one or more of a USB port, a display port, an HDMI port, an Ethernet port, a Firewire port, or an optical interface.

15. The USB lock system of claim 14, further comprising a storage box for holding the USB lock and the key simultaneously.

16. A universal serial bus (USB) lock system for locking one or more USB ports on an electronic device, comprising:
a USB lock for insertion into a USB port, the USB lock comprising:
a structural interface member having a cavity for alignment with a USB port;
an exterior fascia that is affixed to the structural interface member; and
a detent that holds the USB lock in place within the USB port;
a key for disengaging the USB lock;
a lid that covers the cavity of the exterior fascia; and
wherein the exterior fascia includes a cavity through which the key is inserted and interfaced with the structural member of the lock.

17. The USB lock system of claim 16, wherein the lock, key, and/or storage box comprise one or more planar interfaces or exposed areas sufficient for holding one or more logos or other human readable indicia.

* * * * *